United States Patent
Takahashi et al.

(10) Patent No.: US 11,463,612 B2
(45) Date of Patent: Oct. 4, 2022

(54) CONTROL APPARATUS, CONTROL METHOD, AND PROGRAM

(71) Applicant: Sony Group Corporation, Tokyo (JP)

(72) Inventors: Masahiro Takahashi, Kanagawa (JP); Hidenori Karasawa, Kanagawa (JP); Lyo Takaoka, Tokyo (JP); Daisuke Hiro, Kanagawa (JP); Haruka Kawata, Kanagawa (JP); Ayako Iwase, Kanagawa (JP); Kanako Yana, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/468,643

(22) PCT Filed: Dec. 6, 2017

(86) PCT No.: PCT/JP2017/043758
§ 371 (c)(1),
(2) Date: Jun. 11, 2019

(87) PCT Pub. No.: WO2018/116824
PCT Pub. Date: Jun. 28, 2018

(65) Prior Publication Data
US 2019/0320121 A1   Oct. 17, 2019

(30) Foreign Application Priority Data

Dec. 19, 2016 (JP) .............................. JP2016-245101
Apr. 18, 2017 (JP) .............................. JP2017-081744

(51) Int. Cl.
*H04N 5/232* (2006.01)
*G03B 13/36* (2021.01)
(Continued)

(52) U.S. Cl.
CPC ....... *H04N 5/232121* (2018.08); *G03B 13/36* (2013.01); *G03B 17/20* (2013.01);
(Continued)

(58) Field of Classification Search
None
See application file for complete search history.

(56) References Cited

U.S. PATENT DOCUMENTS

2002/0196348 A1* 12/2002 Kubo .................... H04N 5/772
                                                      348/220.1
2007/0046795 A1*  3/2007 Yamashita ........... H03M 1/123
                                                      348/294
(Continued)

FOREIGN PATENT DOCUMENTS

EP           2424223 A1    8/2011
JP      2009-232227 A     10/2009
(Continued)

OTHER PUBLICATIONS

Extended European Search Report dated Dec. 16, 2019 for corresponding European Application No. 17882777.0.

*Primary Examiner* — Twyler L Haskins
*Assistant Examiner* — Wesley J Chiu
(74) *Attorney, Agent, or Firm* — Michael Best & Friedrich LLP

(57) ABSTRACT

The present technology relates to a control apparatus, a control method, and a program for giving a sense of imaging to a user.
There are provided a processing unit that processes data based on pixel signals output from a plurality of pixels, and a display control unit that causes a display unit to display an image based on the data processed by the processing unit as a through image. The display unit displays a mark indicating a recording process in response to an instruction of recording the data together with the through image displayed on
(Continued)

the display unit. The mark is displayed at each of four corners of the display unit. Alternatively, the mark is displayed near a frame of autofocus. The present technology is applicable to an imaging device.

20 Claims, 25 Drawing Sheets

(51) Int. Cl.
*H04N 5/235* (2006.01)
*G03B 17/20* (2021.01)

(52) U.S. Cl.
CPC ....... *H04N 5/2353* (2013.01); *H04N 5/23293* (2013.01); *H04N 5/232127* (2018.08); *H04N 5/232933* (2018.08)

(56) References Cited

U.S. PATENT DOCUMENTS

| | | | |
|---|---|---|---|
| 2007/0153114 A1 | 7/2007 | Ueda et al. | |
| 2010/0085439 A1* | 4/2010 | Lin | H04N 1/2141 348/222.1 |
| 2010/0097488 A1* | 4/2010 | Suzuki | H04N 5/772 348/222.1 |
| 2011/0176028 A1* | 7/2011 | Toyoda | H04N 5/35581 348/223.1 |
| 2011/0273573 A1* | 11/2011 | Sato | H04N 5/232939 348/220.1 |
| 2012/0105682 A1* | 5/2012 | Hata | H04N 5/23293 348/239 |
| 2013/0300888 A1* | 11/2013 | Kubo | H04N 5/232945 348/220.1 |
| 2014/0063316 A1* | 3/2014 | Lee | H04N 5/772 348/333.02 |
| 2014/0071324 A1* | 3/2014 | Tokunaga | H04N 5/23293 348/333.02 |
| 2014/0204243 A1* | 7/2014 | Hayashi | H04N 9/79 348/231.99 |
| 2015/0194186 A1* | 7/2015 | Lee | G06F 3/041 386/224 |
| 2015/0237280 A1* | 8/2015 | Choi | H04N 5/23245 348/308 |
| 2016/0080686 A1 | 3/2016 | Oyama et al. | |
| 2017/0244883 A1* | 8/2017 | Abe | H04N 5/23293 |

FOREIGN PATENT DOCUMENTS

| | | |
|---|---|---|
| JP | 2010-141582 A | 6/2010 |
| JP | 2013-055589 A | 3/2013 |
| JP | 2013-255188 A | 12/2013 |
| JP | 2016062114 A | 4/2016 |
| KR | 20060072073 A | 6/2006 |
| KR | 20080005098 A | 1/2008 |

* cited by examiner

F I G . 4
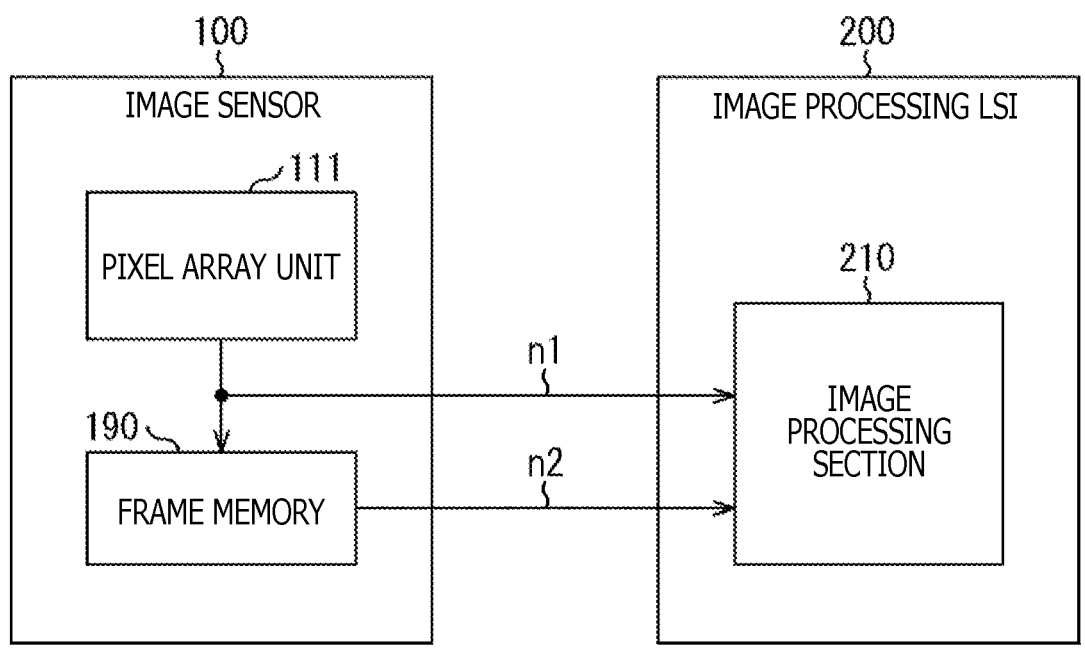

FIG. 29

| BLACK IMAGE | MARK | | | | | | | |
|---|---|---|---|---|---|---|---|---|
| | | SINGLE | CONTINUOUS | SINGLE | CONTINUOUS | SINGLE | CONTINUOUS | SINGLE | CONTINUOUS |
| ON | ON | ■ | ■ | | | | | | |
| ON | OFF | | | ■ | ■ | | | | |
| OFF | ON | | | | | □ | □ | | |
| OFF | OFF | | | | | | | □ | □ |

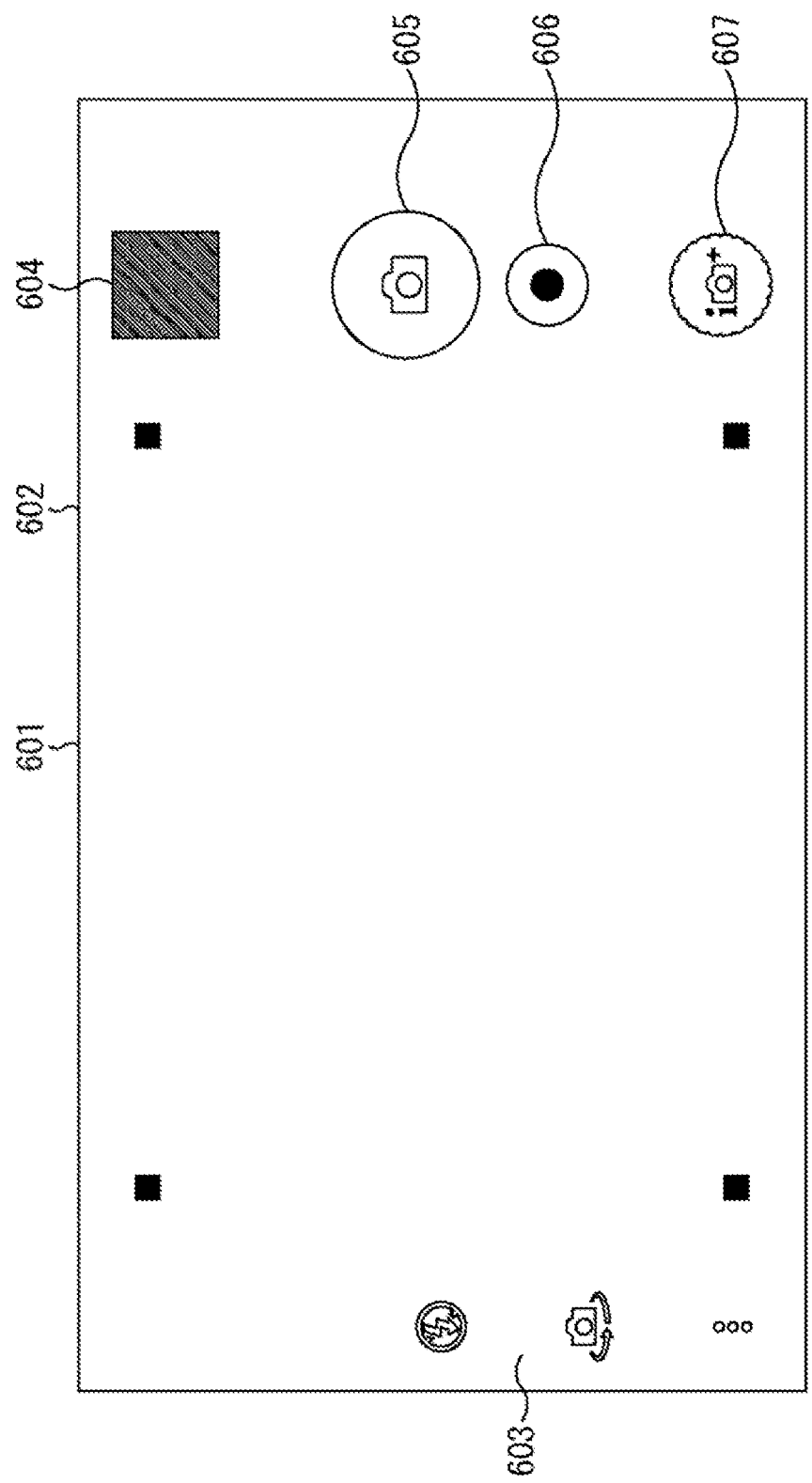

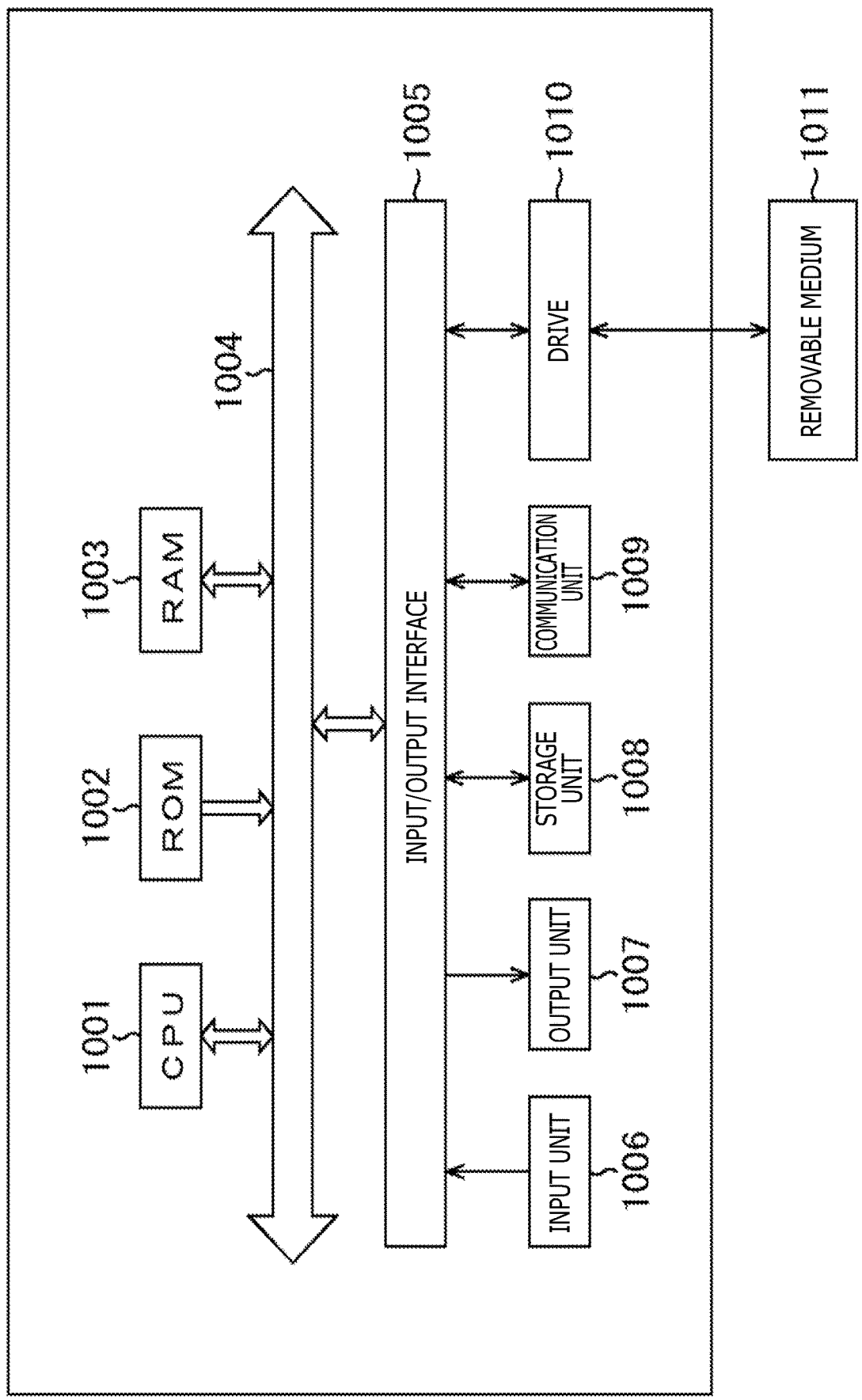

CONTROL APPARATUS, CONTROL METHOD, AND PROGRAM

TECHNICAL FIELD

The present technology relates to a control apparatus, a control method, and a program. For example, the present technology relates to a control apparatus, a control method, and a program for controlling a mechanism which gives a sense of imaging during imaging.

BACKGROUND ART

A digital still camera and a digital video camera, each including an imaging element such as a CCD (Charge Coupled Device) and a CMOS (Complementary Metal-Oxide Semiconductor) sensor, have been widely used in recent years. The digital still camera captures a still image, while the digital video camera captures a moving image. However, there also exist a digital still camera capable of capturing a moving image, and a digital video camera capable of capturing a still image. Note that, in the following description, each of the digital still camera and the digital video camera is also simply referred to as a "digital camera" when distinction between these cameras is not particularly made.

In not a few cases, the digital camera described above includes a display unit constituted by an LCD (liquid crystal display) or the like, and is configured to display a captured image on the display unit, for example. There further exists, in recent years, the digital camera described above of a type which performs image processing for a captured image, such as processing for detecting a human face region from the captured image, and adjusting colors of the detected region.

CITATION LIST

Patent Literature

[PTL 1]
   Japanese Patent Laid-Open No. 2013-055589

SUMMARY

Technical Problems

In recent years, there further exists such a digital camera which increases a pixel number of an imaging element to capture a higher-definition image (high resolution image). Meanwhile, with increase in definition of images, a data volume of these images also tends to increase. Therefore, this data volume increase may also increase a processing time for outputting a captured image, such as a time for displaying a captured image on a display unit checking by a user, and a time for analyzing a captured image, performing image processing for the image based on the analysis, and outputting the processed image.

When the processing time increases, a state called blackout, where no image is displayed on the display unit, may be produced. There also exists such a device which continues display of images called through images. In this case, the through images are not updated and come into a frozen display state during the processing time. Accordingly, some users may be confused considering that certain errors have been caused. For preventing confusion by these users, some devices intentionally display a black image to create a situation of blackout.

However, during non-display of a screen on the display unit (blackout), or display of a frozen through image, problems such as a loss of sight of an object may be caused. Accordingly, reduction of the period of blackout (period of display of frozen through image) has been demanded.

On the other hand, some photographers (users) recognize timing of imaging or exposure time based on generation of blackout. Accordingly, some photographers may feel inconvenience when timing of imaging or exposure time is unrecognizable due to absence of blackout.

It is demanded to provide a mechanism for allowing a user to recognize timing of imaging or exposure time, and giving a sense of imaging to the user.

The present technology has been developed in consideration of the aforementioned circumstances, and gives a sense of imaging to a user.

Solution to Problems

An imaging device according to one aspect of the present technology includes a processing unit configured to process data based on pixel signals output from a plurality of pixels, and a display control unit configured to control a display unit to display an image based on the data processed by the processing unit as a through image. The processing unit displays a mark indicating a recording process in response to an instruction of recording the data together with the through image displayed on the display unit.

An imaging method according to one aspect of the present technology is directed to a control method of a control apparatus that includes a processing unit configured to process data based on pixel signals output from a plurality of pixels, and a display control unit configured to control a display unit to display an image based on the data processed by the processing unit as a through image. The control method includes a step configured to control the processing unit to display a mark indicating a recording process in response to an instruction of recording the data together with the through image displayed on the display unit.

A program according to one aspect of the present technology is directed to a program for a computer that controls a control apparatus that includes a processing unit configured to process data based on pixel signals output from a plurality of pixels, and a display control unit configured to control a display unit to display an image based on the data processed by the processing unit as a through image. The program causes the computer to execute a process that includes a step configured to control the processing unit to display a mark indicating a recording process in response to an instruction of recording the data together with the through image displayed on the display unit.

According to the imaging device, the imaging method, and the program of the one aspect of the present technology, data based on pixel signals output from the plurality of pixels is processed, and an image corresponding to the processed data is displayed on the display unit as a through image. Moreover, a mark indicating a recording process is displayed in response to an instruction of recording the data together with the through image displayed on the display unit.

Note that the control apparatus may be either an independent device, or an internal block constituting one apparatus.

Also, the program may be transmitted via a transmission medium, or provided in a form of a recording medium in which the program is recorded.

Advantageous Effect of Invention

According to an aspect of the present technology, a sense of imaging is given to a user.

Note that advantageous effects are not limited to those described herein, but may include any of advantageous effects described in the present disclosure.

BRIEF DESCRIPTION OF DRAWINGS

FIG. 4 is a diagram explaining an outline of an imaging device according to an aspect of the present technology.

FIG. 29 is a diagram explaining a combination of feedback display.

FIG. 31 is a diagram explaining an application to a smartphone.

FIG. 32 is a diagram explaining a recording medium.

DESCRIPTION OF EMBODIMENTS

A mode for carrying out the present technology (hereinafter referred to as embodiment) is hereinafter described.

Comparative Example

Figure 1:
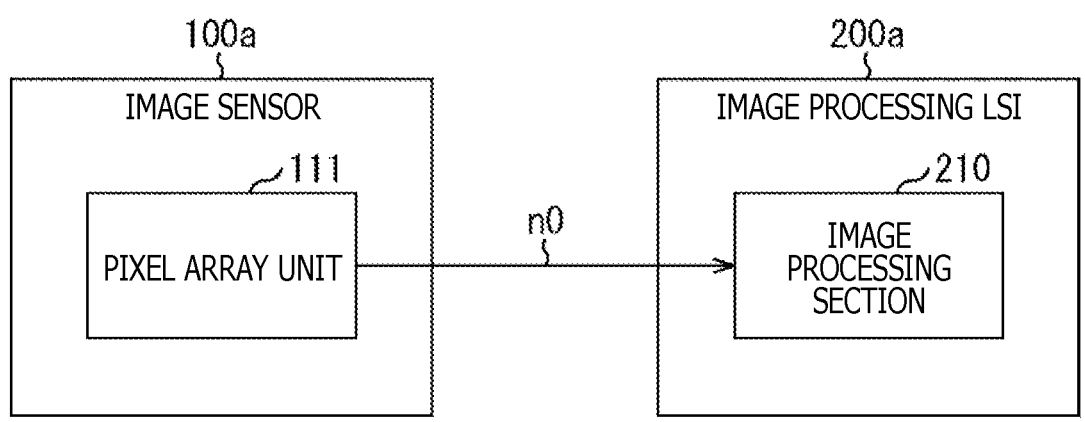
FIG. 1 is a diagram explaining an example of a schematic configuration of an imaging device according to a comparison example.
Figure 2:
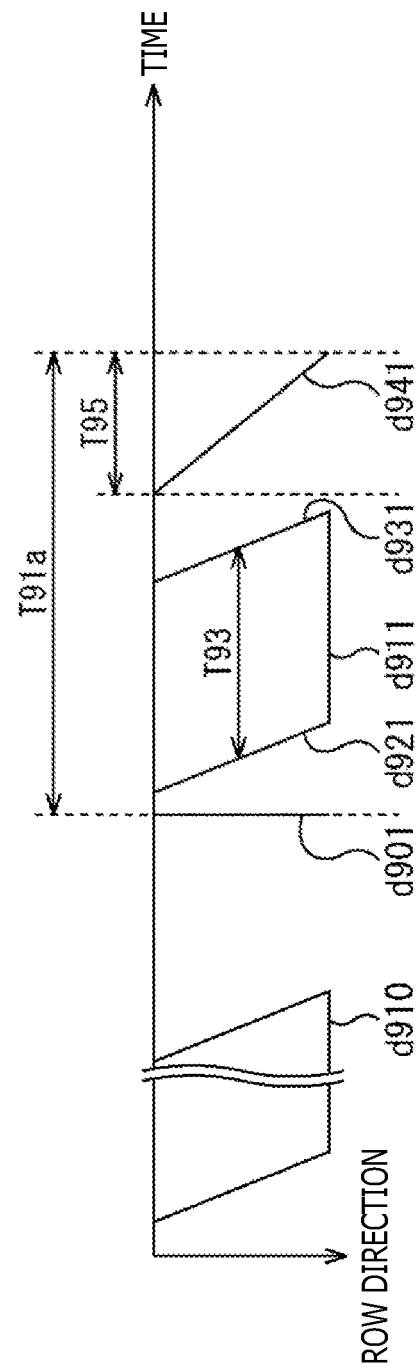
FIG. 2 is a diagram explaining a flow of a process performed by an imaging device according to a comparative example.
Figure 3:
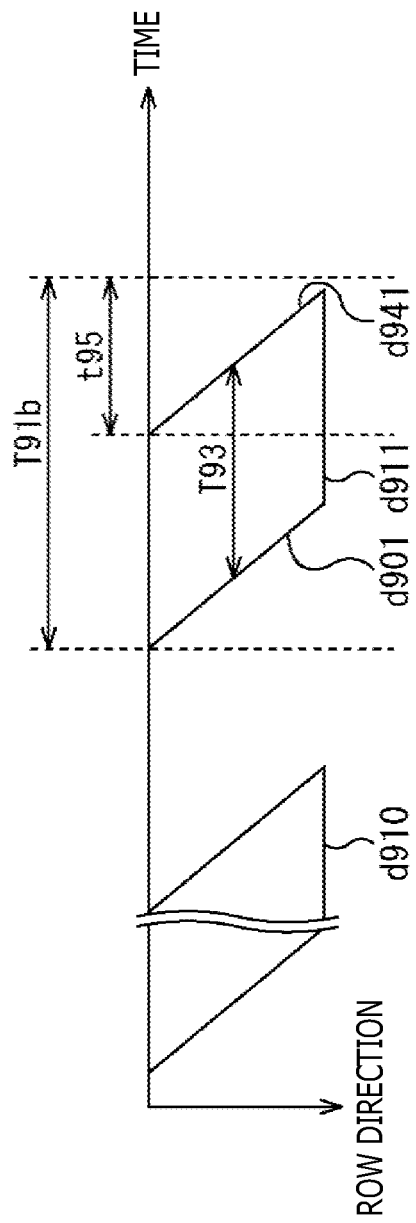
FIG. 3 is a diagram explaining a flow of a process performed by an imaging device according to a comparative example.

Before describing an imaging device according to the embodiment of the present disclosure, a conventional imaging device is touched upon with reference to FIGS. 1 to 3 as a comparative example of the imaging device according to the present embodiment. An outline of an imaging device according to a comparative example is initially described with reference to FIG. 1. FIG. 1 is an explanatory diagram explaining an example of a schematic configuration of the imaging device according to the comparison example. Note that the example depicted in FIG. 1 is hereinafter also referred to as comparative example 1.

In FIG. 1, a component to which reference number 100a is given schematically indicates an image sensor included in the imaging device according to comparative example 1. The image sensor 100a is an imaging element, such as a CMOS (complementary metal-oxide semiconductor) image sensor and a CCD (charge coupled device) image sensor, which captures an image of an object and acquires digital data indicating the captured image. The image sensor 100a includes a pixel array unit 111 where a plurality of pixels are disposed in a form of matrix (array). Note that the image sensor 100a generally also includes circuits other than the pixel array unit 111. However, the example depicted in FIG. 1 does not depict circuits other than the pixel array unit 111 for easy understanding of the description.

Also, a process to which reference number 200a is given schematically indicates an image processing LSI (large scale integration) which performs what is called image processing for image signals supplied in accordance with pixel signals received from respective pixels of the pixel array unit 111. Examples of the image processing include black level correction, color mixture correction, defect correction, demosaic processing, matrix processing, gamma correction, and YC conversion.

An image processing section 210 schematically indicates image processing functions implemented by the image processing LSI 200a. Note that the image processing LSI 200a may include configurations for executing functions other than image processing. In the example depicted in FIG. 1, however, depiction of configurations other than the image processing section 210 is omitted for easy understanding of the description.

Also, a flow to which reference number n0 is given schematically indicates a flow (stream) of signals between the image sensor 100a and the image processing LSI 200a. More specifically, according to the imaging device of comparative example 1 depicted in FIG. 1, the image sensor 100a performs photoelectric conversion of light entering via a not-depicted optical element, and analog/digital conversion of pixel values of respective pixels to generate image signals indicating a captured image of an object. In addition, the image sensor 100a outputs the generated image signals to the image processing section 210 of the image processing LSI 200 as a stream n0.

The image processing LSI 200a acquires the image signals output from the image sensor 100a as the stream n0, performs image processing for the acquired image signals, and displays the image signals subjected to the image processing on a display unit (not depicted) as a preview image (what is called through image or monitor image), for example. As a result, a user can check the captured image via the display unit.

Described next with reference to FIG. 2 is an example of a flow of a process performed by the imaging device depicted in FIG. 1, in a period from exposure (imaging) of an image of an object by the image sensor 100a to reading of image signals indicating the exposed image into the image processing LSI 200a. FIG. 2 is an explanatory view explaining a flow of a process performed by an imaging device of a comparison example, depicting an example of a schematic time chart when what is called focal-plane shutter including mechanical front curtain and rear curtain is adopted. Note that the example depicted in FIG. 2 is hereinafter also referred to as comparative example 2.

In FIG. 2, a horizontal axis indicates time, while a vertical axis indicates a row direction of the pixel array unit 111. Also, periods to which reference numbers d910 and d911 are given each schematically indicate an exposure period of each pixel of the pixel array unit 111. Note that it is assumed that the exposure period to which reference number d910 is given depicts an exposure period of an image captured before the exposure period to which reference number d911 is given.

Described herein is a flow of a series of processes performed during capturing of an image of an object, focusing on the exposure period d911. Initially, pixel signals accumulated in all pixels are reset at timing to which reference number d901 is given. After completion of reset of all the pixels, the front curtain blocking entrance of light into the respective pixels shift in the row direction as indicated by reference number d921. As a result, light blocked by the front curtain enters the respective pixels to start exposure.

Subsequently, the rear curtain shifts in the row direction while following the preceding front curtain as indicated by reference number d931. The rear curtain thereby blocks entrance of light into the respective pixels to complete exposure. More specifically, a period T93 defined by reference numbers d921 and d931 for each pixel corresponds to an exposure time of the corresponding pixel. According to the example depicted in FIG. 2, the exposure start timing and the exposure end timing of respective pixels are different for each row.

Also, a process to which reference number d941 is given in FIG. 2 schematically indicates a process for reading pixel signals from respective pixels. More specifically, according to comparative example 2 depicted in FIG. 2, pixel signals are sequentially read from respective pixels for each row after completion of exposure of a series of pixels. A period to which reference number T95 indicates a period of the process for reading pixel signals from a series of pixels.

More specifically, in case of comparative example 2 depicted in FIG. 2, a captured image is generated after completion of exposure of the series of pixels, and reading of pixel signals from the series of pixels. In other words, in case of comparative example 2 depicted in FIG. 2, an image captured during the exposure period d911 is difficult to output in a period T91a from reset of all pixels to completion of reading of the image signals from the series of pixels.

Note that the image captured during the exposure period d910 can be displayed in the period T91a. However, when the image previously captured is displayed as a monitoring image, for example, an image of the object captured before the image of the object currently viewed by the user is output. In this case, real-time imaging is difficult to achieve.

Described next with reference to FIG. 3 is another example of a flow of a process performed by the imaging device depicted in FIG. 1, from exposure (imaging) of an image of an object by the image sensor 100a to reading of an image signal indicating the exposed image into the image processing LSI 200a. FIG. 2 is an explanatory view explaining a flow of a process performed by the imaging device of the comparison example, depicting an example of a schematic time chart when exposure periods of respective pixels are electronically controlled without using mechanical front curtain and rear curtain. Note that the example depicted in FIG. 3 is hereinafter also referred to as comparative example 3.

In FIG. 3, a horizontal axis indicates time, while a vertical axis indicates a row direction of the pixel array unit 111. Also, periods to which reference numbers d910 and d911 are given each schematically indicate an exposure period of each pixel of the pixel array unit 111 similarly to the example depicted in FIG. 2. It is assumed that the exposure period to which reference number d910 is given depicts an exposure time of an image captured before the exposure time to which reference number d911 is given.

In comparative example 3 depicted in FIG. 3, reset of a pixel signal accumulated in each pixel is synchronized with an exposure start of the corresponding pixel. More specifically, as indicated by reference number d901, reset of respective pixels is sequentially executed for each row. Also, after completion of reset of each pixel, exposure of the corresponding pixel is promptly started. Moreover, an end of exposure of each pixel is synchronized with reading of a pixel signal from the corresponding pixel. More specifically, as indicated by reference number d941, after completion of exposure of each pixel, reading of a pixel signal from the corresponding pixel is promptly started.

According to the configuration in comparative example 3 depicted in FIG. 3, reading of pixel signals from respective pixels can start without waiting until completion of exposure of all pixels. Therefore, in case of comparative example 3 depicted in FIG. 3, the period T91b from the start of exposure to completion of reading of pixel signals from the series of pixels may become shorter than the corresponding period in comparative example 2 depicted in FIG. 2.

However, according to comparative example 3 depicted in FIG. 3, a scanning speed of respective pixels is dependent on a reading speed of pixel signals from respective pixels as indicated by reference number d941. Therefore, when a transmission speed of the stream n0 depicted in FIG. 1 is limited, for example, the scanning speed lowers as resolution of the captured image increases. In this case, focal plane distortion may be produced, for example. Note that examples of the case which limits the transmission speed of the stream n0 include a case which limits a bus band between the image sensor 100a and the image processing LSI 200a.

Also, in each of comparative example 2 and comparative example 3 described above, image processing for the captured image is performed in accordance with a result of analysis of the image based on pixel signals after completion of reading of the pixel signals from the series of pixels and analysis of the image based on the pixel signals.

Therefore, in each of comparative example 2 and comparative example 3, processing time for the process from the exposure to the process for reading pixel signals, and the process for analyzing the image based on the pixel signals increases as resolution of the captured image increases. As a result, a time required for output of the image increases.

When the time required for output of an image (processing time) increases, a state called blackout, where no image is displayed on the display unit, may be produced. There also exists such a device which continues display of images called through images during the processing time. In this case, the through images are not updated during the processing time, and therefore come into a frozen display state. Accordingly, some users may be confused considering that certain errors have been caused. For preventing confusion by these users, some devices intentionally display a black image to create a situation of blackout.

However, during non-display of a screen on the display unit (blackout), or display of a frozen through image, problems such as a loss of sight of an object may be caused. Accordingly, reduction of the period of blackout (period of display of frozen through image) has been demanded.

The imaging device according to the present embodiment therefore reduces a processing time for output of a captured image, such as a time for displaying a captured image on a display unit checking by a user, and a time for analyzing the captured image, performing image processing for the image, and outputting the image.

<Configuration of Imaging Device as Application of Present Technology>

An outline of an imaging device according to the present embodiment is now described with reference to FIG. 4. FIG. 4 is an explanatory diagram explaining an outline of an imaging device according to the embodiment of the present disclosure. Note that FIG. 4 depicts a schematic configuration of the imaging device according to the present embodiment, focusing on an image sensor 100 and an image processing LSI 200. Other configurations are not depicted in the figure.

As depicted in FIG. 4, the image sensor 100 according to the present embodiment is different from the image sensor 100a according to comparative example 1 depicted in FIG. 1 in that a frame memory 190 is added. Flows to which reference numbers n1 and n2 are given each schematically indicate a flow (stream) of signals between the image sensor 100 and the image processing LSI 200.

Also, the imaging device according to the present embodiment electronically controls exposure periods of respective pixels without using mechanical front curtain and rear curtain similarly to comparative example 3 explained with reference to FIG. 3. Therefore, the imaging device of the present embodiment is configured to sequentially read pixel signals from exposed pixels without waiting until exposure completion of all pixels.

Specifically, according to the imaging device of the present embodiment depicted in FIG. 4, the image sensor 100 performs photoelectric conversion of light entering via a not-depicted optical element, and A/D conversion of pixel values of respective pixels to generate image signals indicating a captured image of an object. In this case, the image sensor 100 outputs, to the image processing LSI 200, image signals as the stream n1 based on image signals of at least a part of a plurality of pixels constituting the pixel array unit 111.

Also, the image sensor 100 also temporarily stores, in the frame memory 190, pixel signals from the plurality of pixels constituting the pixel array unit 111. In addition, the image sensor 100 sequentially reads pixel signals of respective pixels stored in the frame memory 190, and outputs image signals based on the read pixel signals to the image processing LSI 200 as the stream n2.

In this configuration, the image sensor 100 is capable of outputting, to the image processing LSI 200, low resolution images (i.e., thinned-out images) based on pixel signals from a part of pixels as the stream n1, and high resolution images based on pixel signals from all pixels as the stream n2, for example.

Note that the image sensor 100 can temporarily retain pixel signals of all pixels in the frame memory 190, wherefore the stream n1 and the stream n2 are not required to be output to the image processing LSI 200 at the same timing in parallel. More specifically, the image sensor 100 is allowed to output the stream n2 after the output of the stream n1. Needless to say, the image sensor 100 may output the stream n1 and the stream n2 to the image processing LSI 200 in parallel.

Therefore, for example, the image processing LSI 200 may display image signals initially output from the image sensor 100 as the stream n1 (low resolution images) on the display unit as preview images, and record image signals output as the stream n2 (high resolution images) in a recording medium as image data.

The imaging device of the present embodiment thus configured is capable of reducing a time required from completion of exposure to display of preview images (i.e., screen non-display time after capturing image) in comparison with the respective comparative examples described above even when the transmission speed between the image sensor 100 and the image processing LSI 200 is limited.

The screen non-display time after capturing an image is called blackout in some cases. According to the present embodiment, this blackout period can be shortened, or decreased to zero.

As described above, image signals of low resolution images (stream n1) are used for preview images displayed on the display unit. Image signals of low resolution images have a small data size, wherefore a time required for transfer or for processing can be reduced.

Accordingly, continuous display of preview images on the display unit is achievable at predetermined intervals (update rate of preview images), wherefore generation of blackout is avoidable.

Meanwhile, high-resolution images (stream n2) are used for image signals for recording. High resolution image signals have a large data size, wherefore the time required for transfer or for processing is longer than that time of the stream n1.

If the stream n2 is used for preview images, the time required for transfer or for processing becomes longer than the update rate of the preview images. In this case, the preview images may become difficult to update. This situation causes freezing of preview images or blackout, in which condition the user may have a feeling of insecurity.

According to the present technology, however, preview images are displayed on the display unit using the stream n1 having a small data size as described above. Accordingly, freezing of preview images or blackout is avoidable.

Moreover, at the time of screen non-display on the display unit (blackout) or freezing of displayed images, a problem of a loss of sight of an object may be caused during this period. According to the imaging device of the present embodiment, however, the time of blackout can be reduced (to zero). Accordingly, the possibility of the problem of a loss of sight of an object can decrease.

Also, in another example, the image processing LSI 200 is capable of analyzing image signals initially output from the image sensor 100 as the stream n1 (low resolution image), and performing image processing for image signals output as the stream n2 (high resolution image) in accordance with a result of the analysis.

More specifically, the image processing LSI 200 is capable of executing both analysis of image signals output as the stream n1, and acquisition of image signals output as the stream n2 in parallel. In addition, acquisition of image signals of low resolution images as the stream n1 can reduce both the time required for acquisition of image signals as analysis targets, and the time required for performing the analysis in comparison with a configuration which analyzes image signals of all pixels.

Therefore, the imaging device of the present embodiment can reduce a time required from completion of exposure to output of a captured image after analysis of the image and image processing for the image in accordance with a result of the analysis.

Moreover, the image processing LSI 200 having the configuration described above can acquire the streams n1 and n2 in a time-division manner. In this case, image signals of images captured in the same frame can be used as both the streams n1 and n2. Therefore, the imaging device of the present embodiment can increase accuracy of image processing in comparison with image processing performed in accordance with a result of analysis of image signals captured in different frames.

Also, in a different example, the image processing LSI 200 may sequentially acquire image signals of low resolution images from the image sensor 100 as the stream n1, and generate moving images on the basis of the acquired images. Also, in this case, the image processing LSI 200 may acquire image signals of high resolution images corresponding to a desired frame (e.g., frame designated by user) as the stream n2, and generate still image on the basis of the acquired image signals.

The imaging device of the present embodiment thus configured can simultaneously acquire both moving images and still images, and record images of higher resolution than resolution of moving images as still images. Also, at this time, image signals of high resolution images are output only from a desired frame of the image sensor 100. Therefore, the imaging device of the present embodiment is capable of minimizing the volume of image signals transmitted between the image sensor 100 and the image processing LSI 200, thereby reducing the time required for output of respective images.

Figure 5:
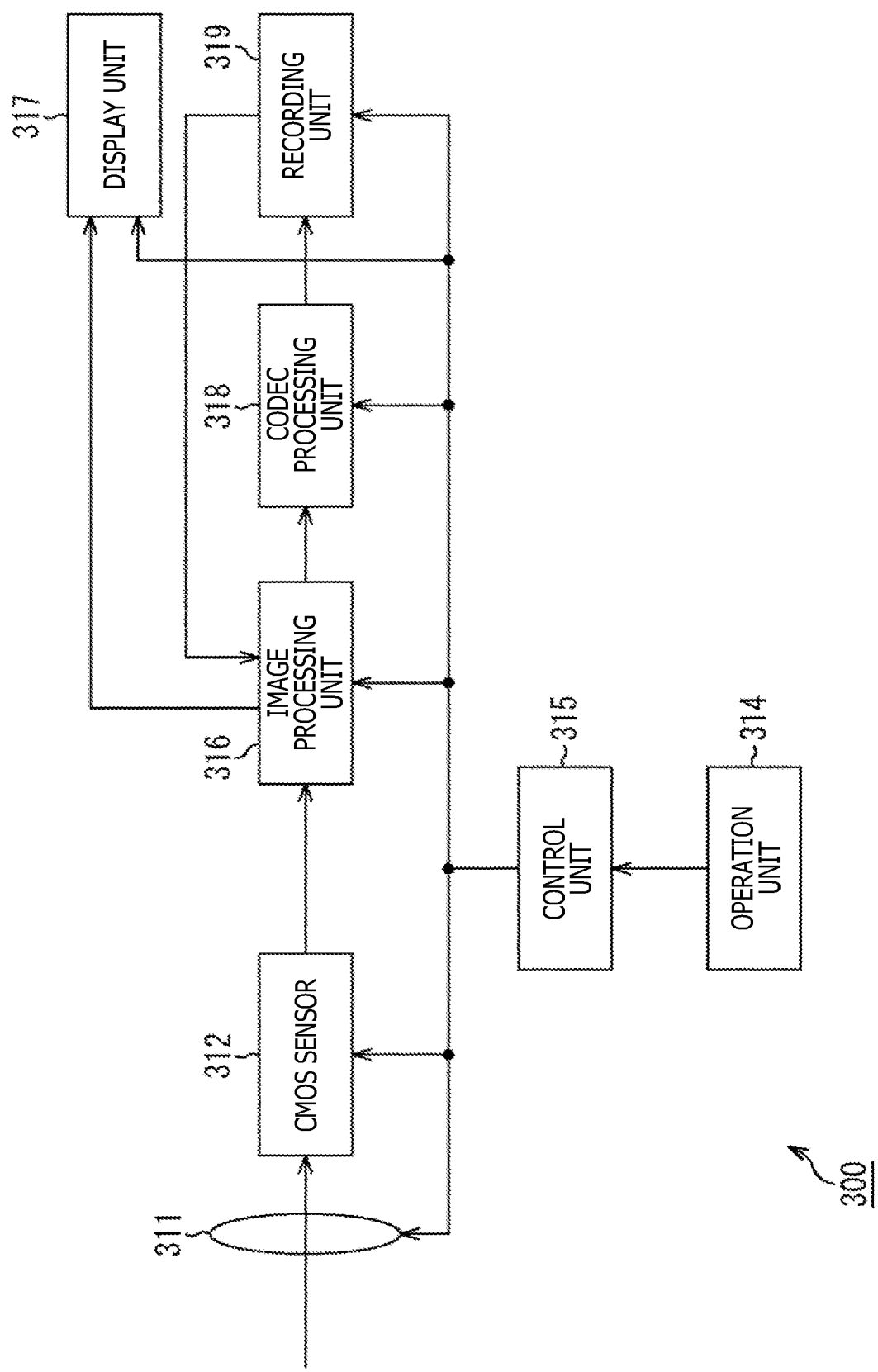
FIG. 5 is a diagram depicting a configuration of an example of the imaging device.

An example of a configuration of the imaging device according to the present embodiment is further described with reference to FIG. 5. FIG. 5 is a block diagram depicting an example of the configuration of the imaging device according to the present embodiment, where the image sensor 100 and the image processing LSI 200 described above and are provided in the same housing. An imaging device 300 depicted in FIG. 5 is a device which captures an image of an object, and outputs the image of the object as an electric signal.

As depicted in FIG. 5, the imaging device 300 includes a lens unit 311, a CMOS sensor 312, an operation unit 314, a control unit 315, an image processing unit 316, a display unit 317, a codec processing unit 318, and a recording unit 319.

The lens unit 311 is constituted by optical elements such as a lens and a diaphragm. The lens unit 311 adjusts a focus between the lens unit 311 and an object under control by the control unit 315, collects light from a focused position, and supplies the light to the CMOS sensor 312.

The CMOS sensor 312 is an image sensor which captures an image of an object, and acquires data indicating the captured image of the object (captured image) by photoelectric conversion of incident light and A/D conversion of pixel values of respective pixels under control by the control unit 315. The CMOS sensor 312 supplies the captured image data acquired by the imaging to the image processing unit 316 under control by the control unit 315.

The operation unit 314 is constituted by a jog dial (trademark), keys, buttons, or a touch panel, for example, and receives operation input from the user and supplies signals corresponding to the operation input to the control unit 315.

The control unit 315 controls driving of the lens unit 311, the CMOS sensor 312, the image processing unit 316, the display unit 317, the codec processing unit 318, and the recording unit 319 in accordance with signals corresponding to operation input by the user through the operation unit 314 to cause the respective units to perform processing associated with imaging.

The image processing unit 316 performs various types of image processing, such as black level correction, color mixture correction, defect correction, demosaic processing, matrix processing, gamma correction, and YC conversion, for the image signals supplied from the CMOS sensor 312. Any types of image processing, including processing other than processing described above, may be performed. The image processing unit 316 supplies image signals subjected to image processing to the display unit 317 and the codec processing unit 318.

The display unit 317 is constituted by a liquid crystal display or the like, for example, and displays an image of an object in accordance with image signals received from the image processing unit 316.

The codec processing unit 318 performs a coding process of a predetermined system for the image signals received from the image processing unit 316, and supplies image data obtained by the coding process to the recording unit 319.

Image data received from the codec processing unit 318 is recorded in the recording unit 319. The image data recorded in the recording unit 319 is read by the image processing unit 316 as necessary, and supplied to the display unit 317 to display a corresponding image.

The CMOS sensor 312 of the imaging device 300 corresponds to the image sensor 100 described above with reference to FIG. 4. The image processing unit 316 of the imaging device 300 corresponds to the image processing section 210 described above with reference to FIG. 4. Also, the image processing section 210 (image processing LSI 200) described with reference to FIG. 4 may include the codec processing unit 318, the control unit 315 and others of the imaging device 300.

The CMOS sensor 312 includes a selection unit (switch) for selecting the number of analog-digital converters (ADCs) (column ADCs) which are output destinations of signals from one pixel. More specifically, the CMOS sensor 312 is allowed to output more various types of pixel signals in accordance with the number of ADCs. Consequently, the imaging device 300 is capable of implementing more various types of processing using various types of pixel signals.

Also, the CMOS sensor 312 further includes the frame memory 190, and temporarily retains pixel signals of all pixels in the frame memory 190 to output both low resolution images and high resolution images as the streams n1 and n2 different from each other.

Also, the image processing unit 316 corresponds to the image processing section 210 of the image processing LSI 200 described above with reference to FIG. 4. Therefore, for example, the image processing unit 316 is capable of displaying image signals, which are initially output from the CMOS sensor 312 (low resolution images), on the display unit as preview images, and recording image signals subsequently output (high resolution images) as image data.

More specifically, the imaging device 300 is capable of reducing a time required from completion of exposure to display of preview images even in a state that a transmission speed between the CMOS sensor 312 and the image processing unit 316 is limited.

Also, in a different example, the image processing unit 316 is capable of analyzing image signals initially output from the CMOS sensor 312 (low resolution images), and performing image processing for image signals subsequently output (high resolution images) in accordance with a result of the analysis. More specifically, the imaging device 300 is capable of reducing a time required from completion of exposure to output of an image after analysis of the captured image and image processing for the captured image in accordance with a result of the analysis.

Moreover, the image processing unit 316 having the above configuration is allowed to apply a result of analysis of a low resolution image to a high resolution image initially output in the same frame as the frame of the low resolution image to perform image processing for the high resolution image. Therefore, the imaging device 300 is capable of increasing accuracy of image processing in comparison with accuracy of image processing in a configuration which performs image processing in accordance with a result of analysis of an image captured in a different frame.

<Operation of Imaging Device>

Figure 6:
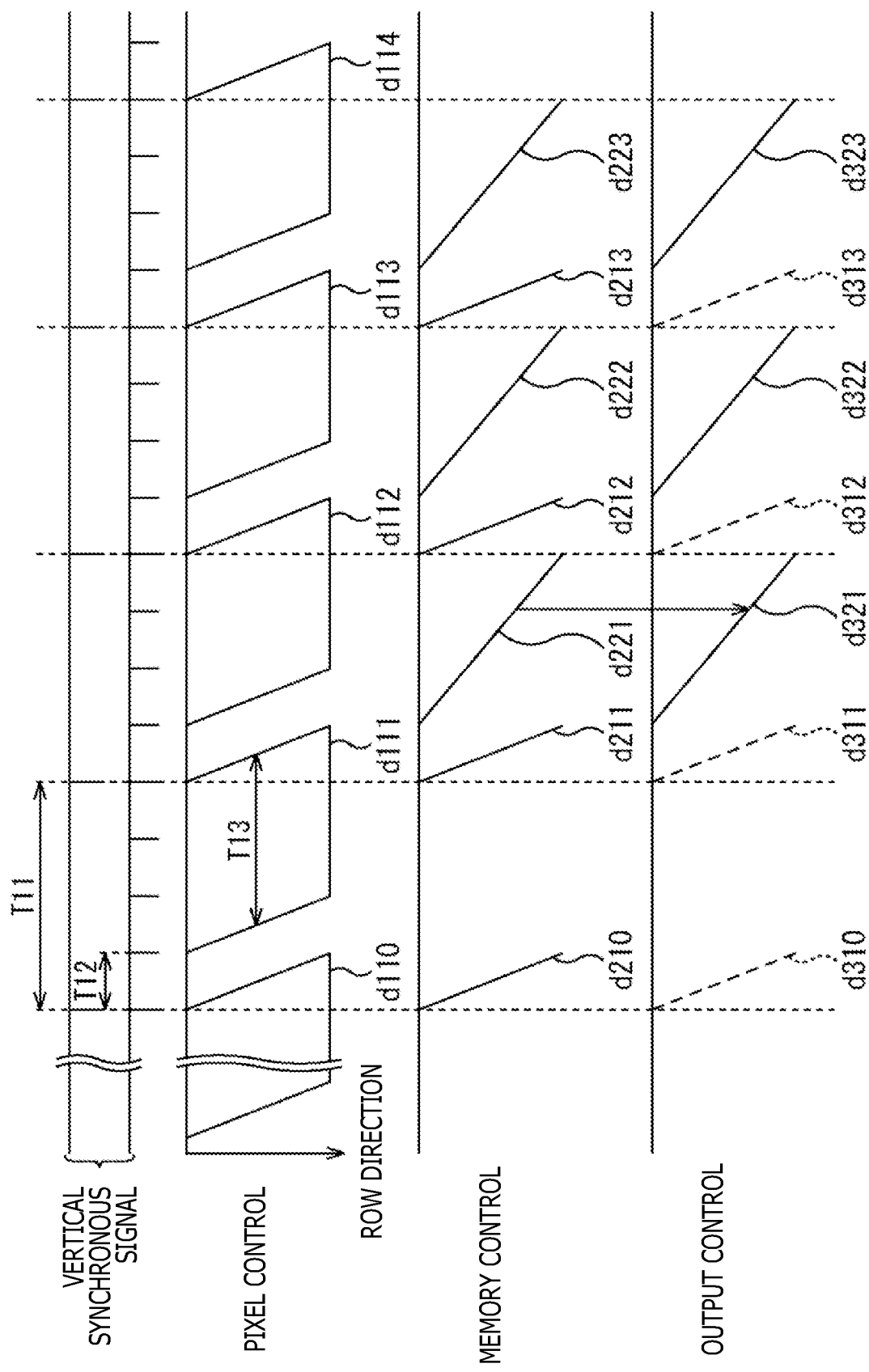
FIG. 6 is a time chart explaining an example of a flow of a process performed by the imaging device.

An operation of the imaging device according to the present embodiment is now described. An example of a flow of a process performed by the imaging device according to the present embodiment is described with reference to FIG. 6 in conjunction with the example of the schematic configuration depicted in FIG. 4. FIG. 6 is a schematic time chart explaining an example of the flow of the imaging device.

FIG. 6 depicts pixel control indicating an exposure process at respective pixels, memory control indicating a process for input and output of pixel signals to and from the frame memory 190, and output control indicating a process for transmission of pixel signals from the image sensor 100 to the image processing LSI 200. In FIG. 6, each horizontal axis represents time. Also, each vertical axis of time charts indicating the pixel control, memory control, and output control represents a position of a pixel as output destination of a target pixel signal in a row direction.

Periods to which reference numbers T11 and T12 are given each indicate a frame rate of an example of a vertical synchronous signal of the image sensor 100 according to the present embodiment. For example, T11 is set to approximately 30 [fps], while T12 is set to approximately 120 [fps]. Note that, as depicted in FIG. 6, the period T11 indicates a period required to complete exposure of a series of pixels, while the period T12 corresponds to a scanning period required for scanning of a series of pixels.

Also, periods to which reference numbers d110 to d114 are given schematically indicate exposure periods of respective pixels of the pixel array unit 111. More specifically, each of the exposure periods d110 to d114 schematically depicts a flow of a process for executing exposure of respective pixels of the pixel array unit 111 in time series while varying start timing for each row in time series. Also, a period to which reference number T13 is given indicates an exposure time of each pixel.

Processes to which reference numbers d210 to d213 are given each indicate a flow of a process where the image sensor 100 writes pixel signals output from respective pixels to the frame memory 190 (process for temporary retention) in the corresponding one of the exposure periods d110 to d113. Note that, in the following description, each of the processes for writing pixel signals to the frame memory 190 indicated by reference numbers d210 to d213 is also simply referred to as a "writing process."

Also, processes to which reference numbers d310 to d313 are given each indicate a flow of a process where the image sensor 100 outputs pixel signals of at least a part of a plurality of pixels constituting the pixel array unit 111 to the image processing LSI 200 as the stream n1 depicted in FIG. 4. Note that, in the following description, each of the processes for outputting pixel signals from the image sensor 100 to the image processing LSI 200 as indicated by reference numbers d310 to d313 is also referred to as a "first output process."

Also, processes to which reference numbers d221 to d223 are given each indicate a flow of a process where the image sensor 100 reads pixel signals written to the frame memory 190 (temporarily retained). Note that, in the following description, each of the processes for reading image signals from the image sensor 100 as indicated by reference numbers d221 to d223 is also simply referred to as a "reading process."

Also, processes to which reference numbers d321 to d323 are given each indicates a flow of a process where the image sensor 100 outputs pixel signals read from the frame memory 190 to the image processing LSI 200 as the stream n2 depicted in FIG. 4. Note that, in the following description, each of the processes where pixel signals read from the frame memory 190 are output from the image sensor 100 to the image processing LSI 200 as indicated by reference numbers d321 to d323 is also referred to as a "second output process."

As depicted in FIG. 6, the writing process d211 and the first output process d311 are executed in synchronization with an end of the exposure period d111. More specifically, when exposure of respective pixels of the pixel array unit 111 ends (i.e., exposure period d111 is completed), the image sensor 100 sequentially writes pixel signals output from the respective pixels to the frame memory 190 at processing timing indicated by the writing process d211.

Also, the image sensor 100 divides pixel signals, which are output from a part of pixels to the frame memory 190, into parts, and directly outputs one of the divided parts of the pixel signals to the image processing LSI 200 at processing timing indicated by the first output process d310. Also, on the other hand, the image sensor 100 writes the other divided part of the pixel signals to the frame memory 190.

This manner of processing is applicable to pixel signals output from respective pixels after completion of exposure periods indicated by d110, and d112 to d114.

Also, the image sensor 100 also sequentially reads pixel signals written to the frame memory 190 (e.g., pixel signals from all pixels) in the writing process d211 after completion of the first output process d311 at processing timing indicated by the reading process d221. In addition, the image sensor 100 subsequently outputs the pixel signals read from the frame memory 190 to the image processing LSI 200 at processing timing indicated by the second output process d321.

This manner of processing is applicable to pixel signals written to the frame memory 190 by the other writing processes d212 and d213 (i.e., pixel signals output after completion of exposure periods d112 and d113).

The image sensor 100 having the configuration described above outputs image signals based on pixel signals from a part of pixels (low resolution image), and image signals based on pixel signals of all pixels (high resolution image) to the image processing LSI 200 by the first output process d311 and the second output process d321 in a time-division manner.

Therefore, for example, the image processing LSI 200 is capable of displaying image signals initially output by the first output process d311 (low resolution image) on the display unit as a preview image, and recording image signals subsequently output by the second output process d321 (high resolution image) as image data.

More specifically, the imaging device of the present embodiment is therefore capable of reducing the time required from completion of exposure to display of preview images even in the state that the transmission speed between the image sensor 100 and the image processing LSI 200 is limited.

Moreover, the image processing LSI 200 is capable of analyzing image signals initially output by the first output process d311 (low resolution image), and performing image processing for image signals subsequently output by the second output process d321 (high resolution image) in accordance with a result of the analysis. More specifically, the imaging device of the present embodiment can reduce a time required from completion of exposure to output of a captured image after analysis of the image and image processing for the image in accordance with a result of the analysis.

Note that, According to the example described above, the first output processes d310 to d323 are executed in accordance with pixel images acquired during the respective exposure periods d110 to d113. However, execution of the first output process for pixel signals acquired in a part of the exposure periods may be omitted.

For example, in case of the example depicted in FIG. 6, execution of the first output process d311 may be omitted. In this case, only high resolution image signals of pixel signals captured in the exposure period d111 are output to the image processing LSI 200 by the second output process d321.

Similarly, execution of the second output process for pixel signals acquired in a part of exposure periods may be omitted. For example, in case of the example depicted in FIG. 6, only low resolution image signals of pixel signals captured in the exposure period d110 are output to the image processing LSI 200 by the first output process d310.

Also, when only low resolution images are output to the image processing LSI 200 by the first output process, the image sensor 100 is not required to execute the writing process, i.e., the process associated with writing of pixel signals to the frame memory 190.

Exposure timing and through image display timing are further described with reference to FIG. 7. An image P1 is captured during an exposure time from time t1 to time t2. It is assumed herein that the image P1 is an image captured for a through image (live view), and not an image captured in response to an instruction from the user.

The live view image, which is an image displayed on the display unit, is captured, processed, and displayed at predetermined intervals.

At time t2, an image signal based on a pixel signal is output from the pixel array unit 111 of the image sensor 100 to the image processing section 210 at the end of exposure. The image signal output at this time is a signal forming a live view image which is a low resolution image. Accordingly, an image signal (stream n1) of a low resolution image is supplied from the pixel array unit 111 to the image processing section 210.

The image signal output from the image sensor 100 from time t2 is processed by the image processing section 210 from time t2. An image based on the processed image signal is displayed on the display unit from time t3. In FIG. 7, the image signal (stream n1) output from the image sensor 100 is expressed as LV (live view), while the image displayed on the display unit is expressed as LV'.

In this case, an image signal LV1 output from the image sensor 100 from time t2 is processed by the image processing section 210, and displayed as an image LV1' on the display unit from time t3 to time t6.

Similarly, an image signal LV2 of an image P2 captured during an exposure time from time t4 to time t5 is output from the image sensor 100 to the image processing section 210 from exposure end time t5. In this case, the image P2 which is an image for live view is not accumulated in the frame memory 190, but is directly output from the image sensor 100 to the image processing section 210.

The image signal LV2 output from the image sensor 100 from time t5 is processed by the image processing section 210, and displayed as an image LV2' on the display unit from time t6 to time t9.

At time B1, imaging is performed in response to an instruction of imaging from the user, such as a predetermined operation including a press of a shutter button. An image signal of an image P3 captured during an exposure time from time t7 to time t8 in accordance with an instruction from the user is processed while divided into an image signal for live view and an image signal for recording.

More specifically, at time t7, an image signal LV3 for live view is directly output from the image sensor 100 to the image processing section 210 as the stream n1. On the other hand, an image signal CAP1 for recording supplied from the pixel array unit 111 is accumulated in the frame memory 190 within the image sensor 100 at time t7.

The image signal CAP1 accumulated in the frame memory 190 is output to the image processing section 210 as the stream n2 at a time after time t7, such as timing described with reference to FIG. 6, for example.

The image signal LV3 output from the image sensor 100 from time t8 is processed by the image processing section 210, and displayed as an image LV3' on the display unit from time t9 to time t12.

In this manner, each of image signals LV for live view and image signals CAP for capturing is output from the pixel array unit 111 and processed when an image for recording is captured. Accordingly, display of images for live view continues without break.

Figure 7:
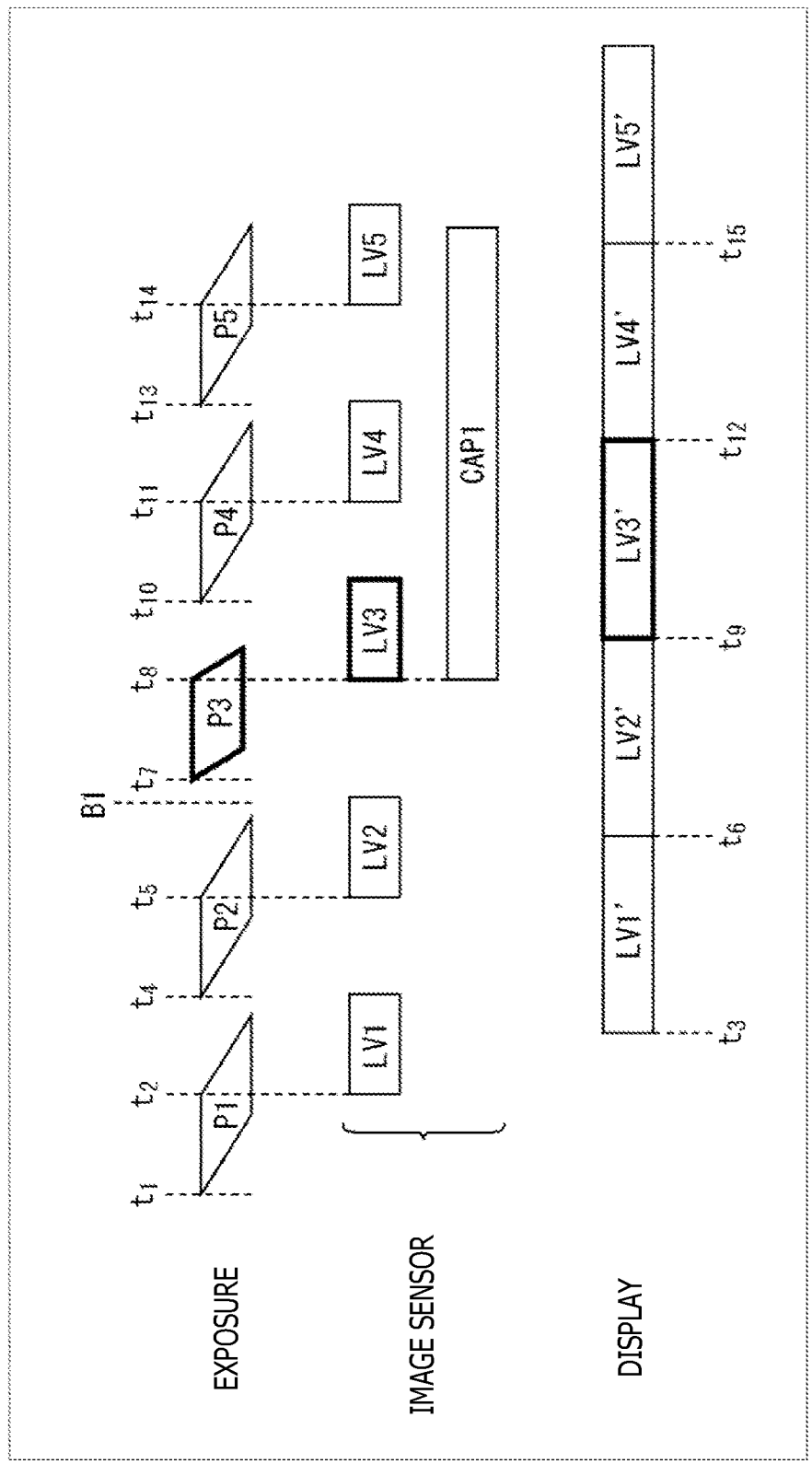
FIG. 7 is a time chart explaining an example of a flow of a process performed by the imaging device.

More specifically, as depicted in FIG. 7, the images LV1', the image LV2', and the image LV3' for live view are displayed without break, wherefore live view images are kept presented to the user without blackout.

After capturing, imaging is performed for every update timing of live view images to acquire image signals for live view images. An image signal LV4 of an image P4 captured during an exposure time from time t10 to time t11 is directly output from the image sensor 100 to the image processing section 210 from exposure end time t11.

The image signal LV4 output from the image sensor 100 from time t12 is processed by the image processing section 210 and displayed on the display unit as an image LV4' from time t12 to time t15.

Furthermore, At update time of live view images without an instruction of imaging from the user, imaging is performed to acquire an image signal for live view image. When an instruction of imaging is issued from the user, imaging is performed in accordance with this instruction.

In this manner, even at the time of imaging in response to an instruction of imaging from the user in the state of update of live view images, live view images can be continuously displayed without break by separately processing image signals for live view image and image signals for recording.

When a time of no display on the screen of the display unit (blackout) is produced, a problem of a loss of sight of an object may be caused during this period. In case of the imaging device of the present embodiment, however, the time of blackout can be reduced (to zero). Accordingly, the possibility of a loss of sight of an object decreases.

Note that timing for processing signals from phase difference pixels is not depicted in FIG. 7, for example. However, in a configuration including phase difference pixels, signals received from the phase difference pixels may be acquired and processed. For example, the phase difference pixels are provided within the pixel array unit 111. Two of the phase difference pixels are paired into one set, and a phase difference is detected from images obtained from the paired two phase difference pixels to generate phase difference information. In addition, focusing on an object is achieved with reference to the phase difference information.

For example, pixel signals from the phase difference pixels are also read from the pixel array unit 111, and supplied to the image processing section 210 to generate phase difference information. For example, a pixel signal from a phase difference pixel is read from the pixel array unit 111 at timing before reading the image signal LV1, and processed by the image processing section 210 to generate phase difference information.

<Feedback During Imaging>

Incidentally, as described above, there is a possibility that the user cannot recognize (sense) imaging timing or exposure time in case of imaging without blackout. Some photographers (users) conventionally recognize execution timing of imaging in response to an instruction or exposure time in accordance with blackout caused during imaging using a mechanical shutter or a long time of transmission of image signals, for example.

Some users sense execution of imaging in response to instructions from the users in accordance with generation of blackout.

Accordingly, some photographers may feel inconvenience when execution timing of imaging in response to an instruction or exposure time is unrecognizable by the absence of blackout.

Accordingly, a process described below may be performed to allow execution timing of imaging in response to an instruction or exposure time to be recognized.

For example, according to an imaging device such as the imaging device 300 depicted in FIG. 5 which includes the display unit 317 and displays live view images on the display unit 317, the user executes imaging while checking live view images displayed on the display unit 317 during imaging.

Figure 8:
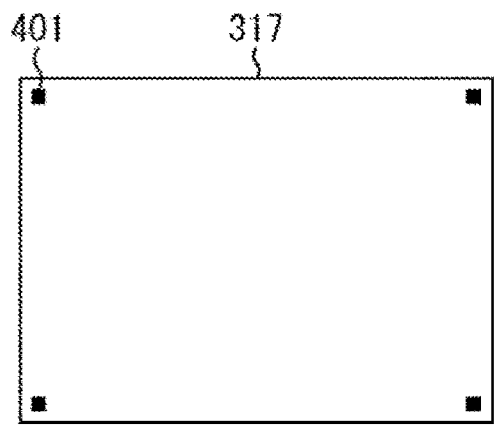
FIG. 8 is a diagram depicting an example of feedback display.

For example, marks 401 depicted in FIG. 8 are displayed on the display unit 317. The marks 401 depicted in FIG. 8 are marks displayed in a square shape for each at four corners of the display unit 317.

For example, the marks 401 are displayed on the display unit 317 during an exposure time of imaging executed in response to an instruction of imaging by the user. For example, again with reference to FIG. 7, imaging based on the instruction from the user is performed from time t7 to time t8. In this case, the marks 401 are displayed on the display unit 317 during the period from time t7 to time t8.

As described above, the marks 401 are displayed during imaging performed in response to an instruction from the user. Accordingly, the photographer can visually recognize the marks 401 during imaging (exposure), and therefore can recognize timing of imaging executed in response to the instruction of imaging and exposure time by visual recognition of the marks 401.

Display modes, display timing and the like of the marks 401 are hereinafter described. Note that, in the following description, display of the marks 401 is referred to as feedback display where appropriate, and assumed to be displayed to give a sense of imaging to the user.

Note that, in the following description, feedback display is performed at the time of instruction of imaging from the user, and displayed at the time corresponding to the exposure time of the imaging, for example. Accordingly, a simple expression "exposure time" refers to an exposure time of imaging executed in response to an instruction from the user, and not an exposure time of imaging performed in predetermined cycles to display live view images. Similarly, it is assumed in the following description that imaging refers to imaging performed at the time of issue of an instruction from the user, and that the imaging timing refers to timing of imaging performed in response to an instruction from the user.

<Setting of Display Time During Exposure Time>

Setting of a display time of feedback in accordance with an exposure time is described with reference to flowchart depicted in FIG. 9. Note that, in the following description, it is assumed that the image processing section 210 (FIG. 4) performs processing associated with feedback. However, a function of performing processing associated with feedback may be provided separately from the image processing section 210 within the image processing LSI 200.

In step S101, the image processing section 210 determines whether or not an exposure time is 40 msec or shorter. Assuming that the marks 401 are displayed during the exposure time, the marks 401 displayed may be visually unrecognizable for the user. In the following description, it is assumed that the user cannot visually recognize the marks 401 when the exposure time is 40 msec or shorter. However, this exposure time may be set to values other than 40 msec presented herein only by way of example.

When it is determined in step S101 that a relationship of exposure time ≤40 msec holds, the process proceeds to step S102. In step S102, the display time of feedback is set to 40 msec.

If the marks 401 are displayed during the exposure time which is 40 msec or shorter in the state that the process has proceeded to step S102, the marks 401 are displayed only for 40 msec or shorter. In this case, there is a possibility that the user cannot visually recognize the marks 401. Accordingly, when the exposure time is 40 msec or shorter, the display time of the marks 401 (feedback) is set to 40 msec to display the marks 401 for a time equivalent to or longer than the exposure time.

When the process proceeds to step S102, the image processing section 210 executes a process for superimposing the marks 401 on an image based on image signals supplied from the pixel array unit 111 as the stream n1. The time of the superimposition is set to 40 msec. For example, the image processing section 210 includes a timer, and starts measuring time from a start of superimposition of the marks

401. When the measured time reaches 40 msec, the image processing section 210 stops superimposition of the marks 401.

On the other hand, when it is determined in step S101 that a relationship of exposure time ≤40 msec does not hold, the process proceeds to step S103. In step S103, the display time of feedback is set to a time equivalent to the exposure time. In the description herein, it is assumed that the display time of feedback is set to the time equivalent to the exposure time. However, the display time of feedback may be set to a time longer than the exposure time.

When the process proceeds to step S103, display time of the marks 401 is set such that the marks 401 are displayed for the exposure time which is longer than 40 msec. In this case, the image processing section 210 executes a process for superimposing the marks 401 on an image based on image signals supplied from the pixel array unit 111 as the stream n1. The time of the superimposition is set to the exposure time.

In step S103, similarly to step S102, the image processing section 210 may include a timer and start measuring time from a start of superimposition of the marks 401. When the measured time reaches a time equivalent to the exposure time, the image processing section 210 may stop superimposition of the marks 401.

In this manner, the display time of the marks 401 (display time of feedback) is controlled in accordance with the exposure time.

Figure 9:
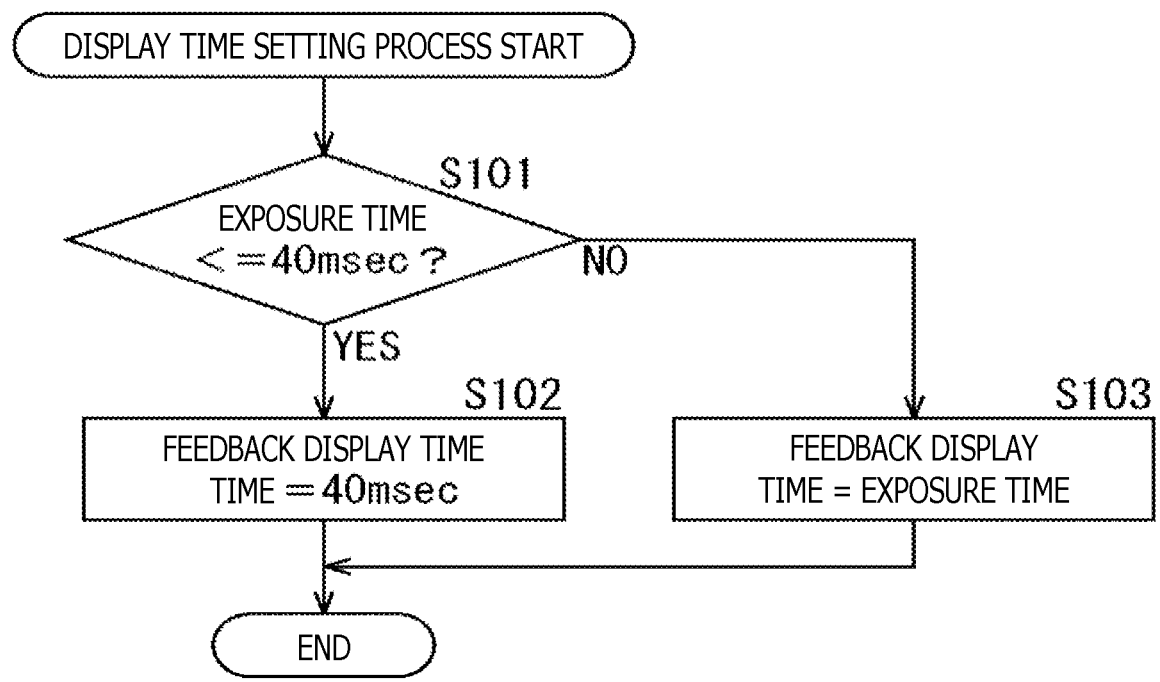
FIG. 9 is a flowchart explaining a display time setting process.
Figure 10:
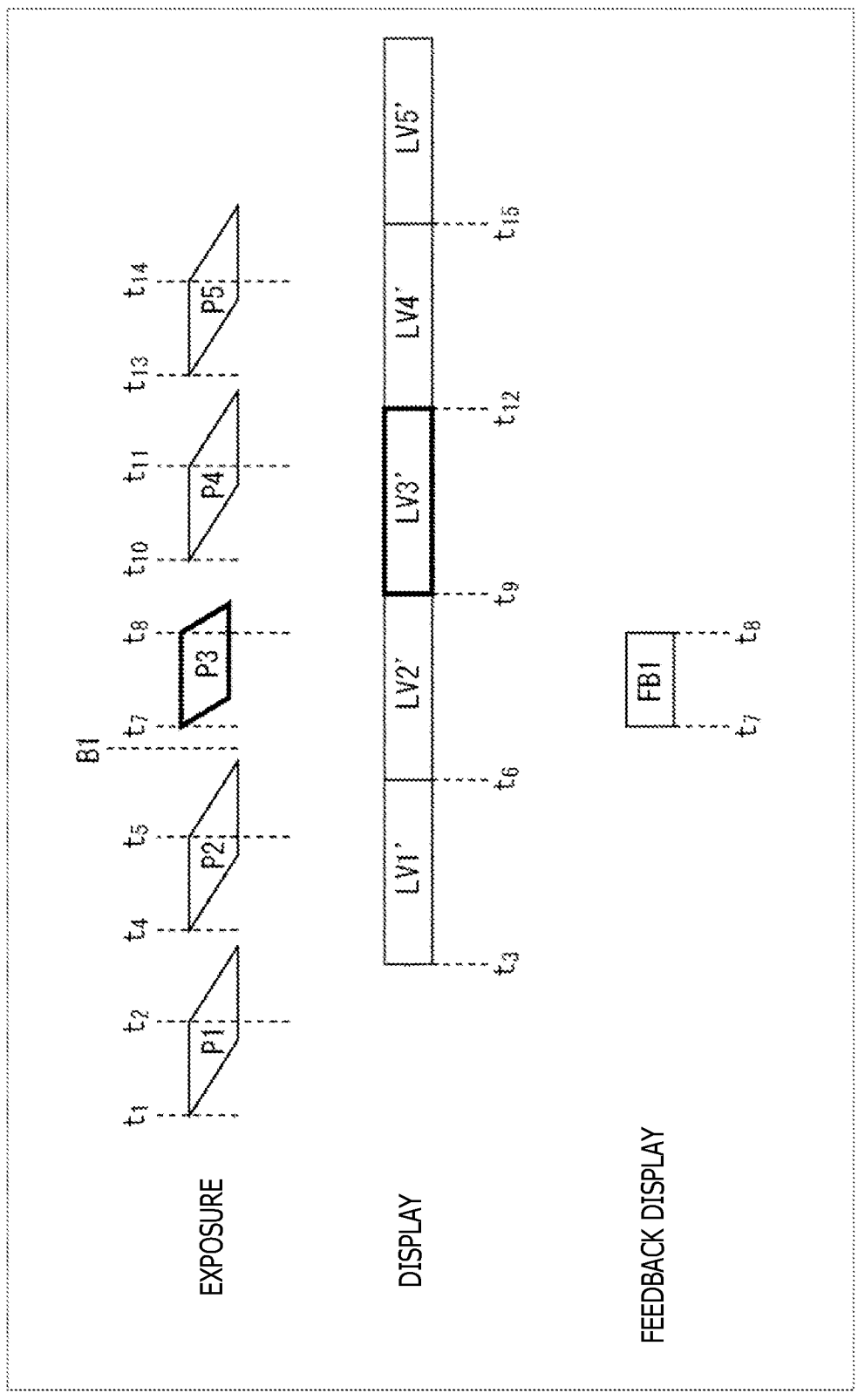
FIG. 10 is a diagram explaining timing of feedback display.
Figure 11:
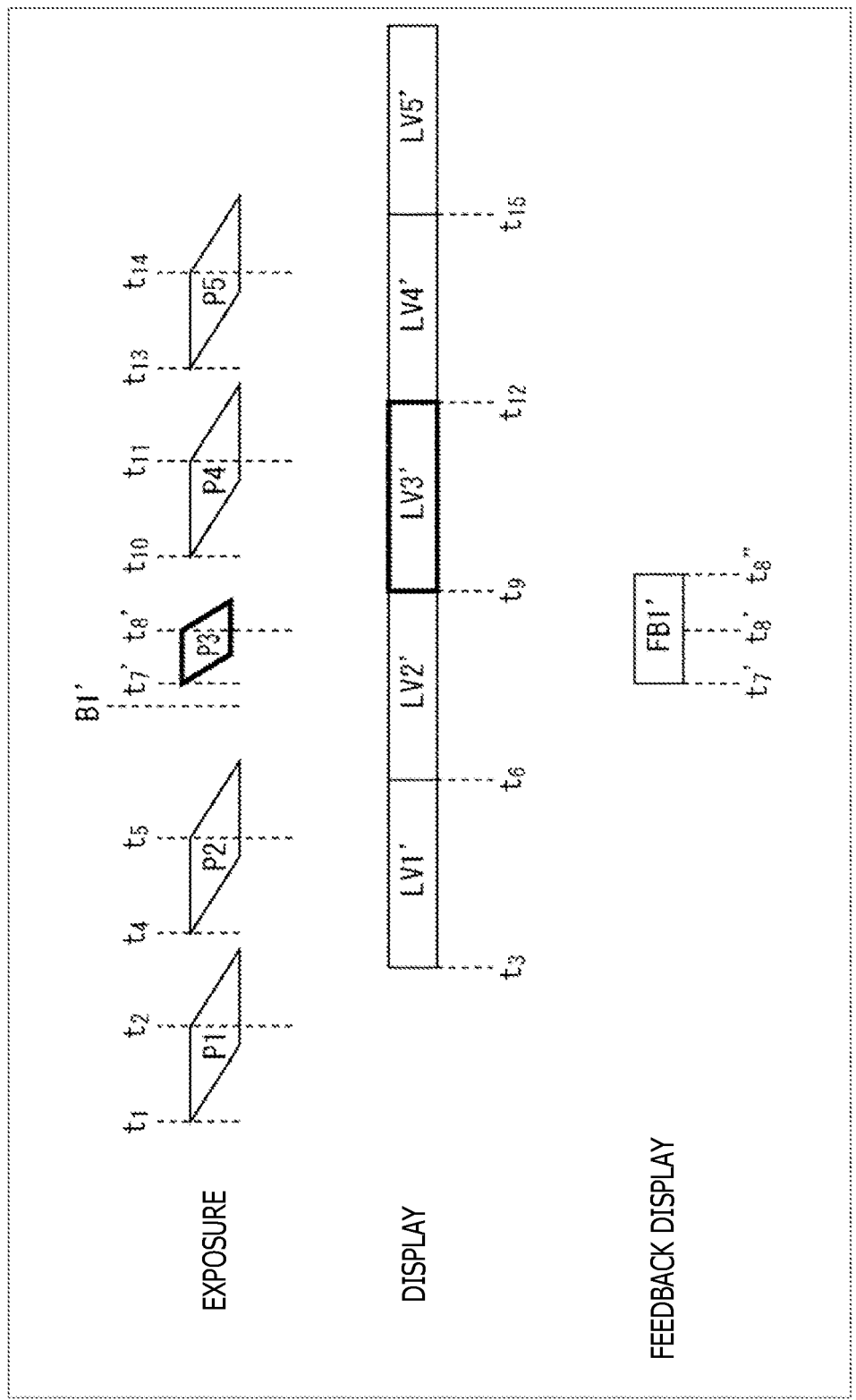
FIG. 11 is a diagram explaining timing of feedback display.

Feedback display performed by execution of the process of FIG. 9 is herein described with reference to FIGS. 10 and 11. FIGS. 10 and 11 are diagrams each explaining exposure, display of through images, and feedback display timing. Initially described with reference to FIG. 10 is a case where the feedback display time is set to a time equivalent to the exposure time in step S103.

When an instruction of imaging is issued from the user at time B1, imaging corresponding to the instruction is performed from time t7 to time t8. More specifically, exposure starts at time t7, and ends at time t8. This period from time t7 to time t8 corresponds to an exposure time. It is determined whether or not this exposure time is 40 msec or shorter.

When it is determined that the exposure time is not 40 msec or shorter by the determination, the feedback display time is set to a time equivalent to the exposure time in step S103. In this case, the feedback display continues from time t7 to time t8, more specifically, for a time equivalent to the exposure time as depicted in FIG. 10.

According to the example depicted in FIG. 10, exposure starts at time t7, and the feedback display is performed at this timing. However, the feedback display is not required to be performed at this timing. For example, the feedback display may start with a short delay from time t7.

Described next with reference to FIG. 11 is a case where the feedback display time is set to 40 msec in step S102.

When an instruction of imaging is issued from the user at time B1', imaging corresponding to the instruction is performed from time t7' to time t8'. More specifically, exposure starts at time t7', and ends at time t8'. This period from time t7' to time t8' corresponds to an exposure time. It is determined whether or not this exposure time is 40 msec or shorter.

When it is determined that the exposure time is 40 msec or shorter by the determination, the feedback display time is set to a time equivalent to 40 msec in step S102. In this case, feedback display continues from time t7' to time t8" as depicted in FIG. 11. According to the example depicted in FIG. 11, time t8" is a time after time t8' corresponding to an exposure end time, and a period from time t7' to time t8" is set to 40 msec.

In this case, exposure and feedback display start at time t7'. The exposure ends at time t8', whereafter the feedback display ends at time t8" after an elapse of 40 msec from exposure start time t7'.

In this example, similarly to the example depicted in FIG. 10, the exposure starts at time t7', and the feedback display is performed at this timing. However, the timing of the feedback display is not required to be this timing. For example, the feedback display may start with a short delay from time t7'.

The control performed in this manner allows the user to visually recognize the marks 401 (feedback) regardless of the length of the exposure time, and thus recognize the execution timing of imaging and the exposure time.

In case of long exposure, for example, the marks 401 are continuously displayed on the display unit 317 during exposure. Accordingly, the photographer can recognize the imaging start timing, the period of continuation of imaging (current exposure), and the imaging end timing by visual recognition of the marks 401.

Note that, during long exposure, a live view image displayed on the display unit 317 becomes a frozen image (remains image captured before exposure start, such as image LV2' in FIG. 10). Also, when a situation of frozen image display is produced, a black image is inserted instead of the display of the frozen image to intentionally produce a blackout state in some cases. Also, in another case, a message of "currently exposing" is displayed on the display unit in the situation of display of a frozen image.

The display of the black image or the display of the message is presented when the exposure time is set to a predetermined time or longer, such as one second or longer, for example.

If the marks 401 are not displayed in the situation of display of the frozen image (black image), the photographer cannot recognize whether or not imaging has been normally performed, and may make an erroneous determination that a frozen image (black image) has been displayed as a result of errors. According to the present technology, however, display of current imaging is fed back to the user. Accordingly, erroneous determination by the photographer is avoidable.

In case of imaging continuously performed (continuous imaging), for example, an exposure time for imaging once becomes short during continuous imaging, such as 40 msec or shorter in some cases. When the exposure time is 40 msec or shorter for imaging once in continuous imaging, the display time of feedback becomes longer than the exposure time. Accordingly, the number of times of feedback display (marks 401) may become smaller than the number of times of imaging.

Figure 12:
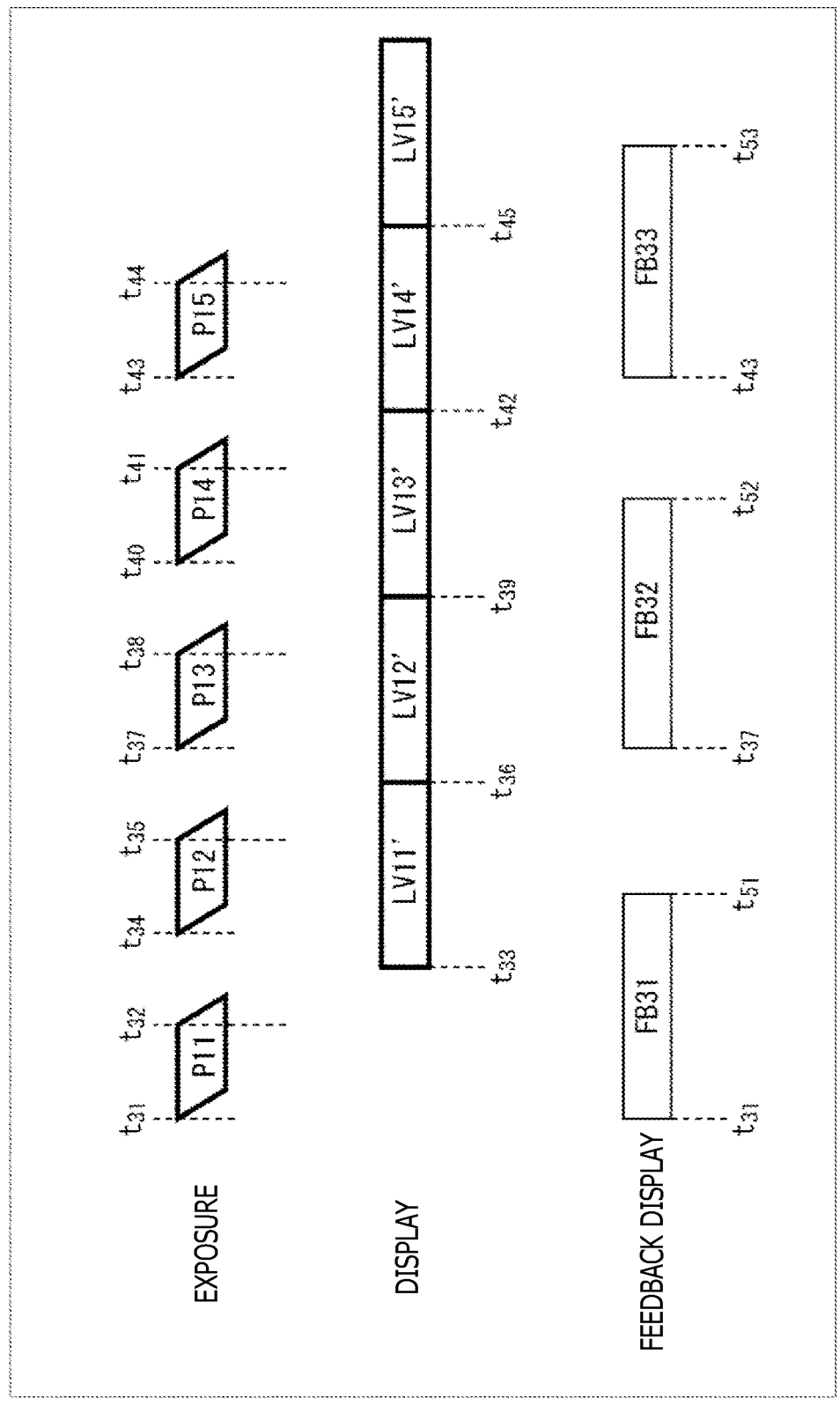
FIG. 12 is a diagram explaining timing of feedback display.

Described herein by way of example is a case where five images are captured during continuous imaging as depicted in FIG. 12. An image P11 is captured during an exposure time from time t31 to time t32. An image P12 is captured during an exposure time from time t34 to time t35. An image P13 is captured during an exposure time from time t37 to time t38. An image P14 is captured during an exposure time from time t40 to time t41. An image P15 is captured during an exposure time from time t43 to time t44.

It is assumed that the respective exposure times for exposing the images P11 to P15 are all set to 40 msec or shorter. In this case, the feedback display time is set to 40 msec for each, wherefore feedback display is performed three times as depicted in FIG. 12, for example.

For example, as depicted in FIG. 12, feedback display FB31 starts from time t31 corresponding to the start of capturing the image P11, and continues for 40 msec. Similarly, feedback display FB32 starts from time t37 corresponding to the start of capturing the image P13, and continues for 40 msec. Similarly, feedback display FB33 starts from time t43 corresponding to the start of capturing of the image P15, and continues for 40 msec.

In this manner, feedback display is performed three times. More specifically, in this case, feedback display is performed three times for five images of continuous imaging.

Note that the example described herein is the case where the minimum display time for feedback display (40 msec) is set. Instead, a minimum non-display time may be set as a period when feedback is not displayed. For example, feedback display is not performed during a period from time t51 to time t37 in FIG. 12. This period may be a time set for non-display of feedback beforehand.

The minimum display time and the minimum non-display time may both set to secure visibility of feedback display.

In this manner, the number of times of feedback display may be smaller than the number of times of imaging.

Figure 13:
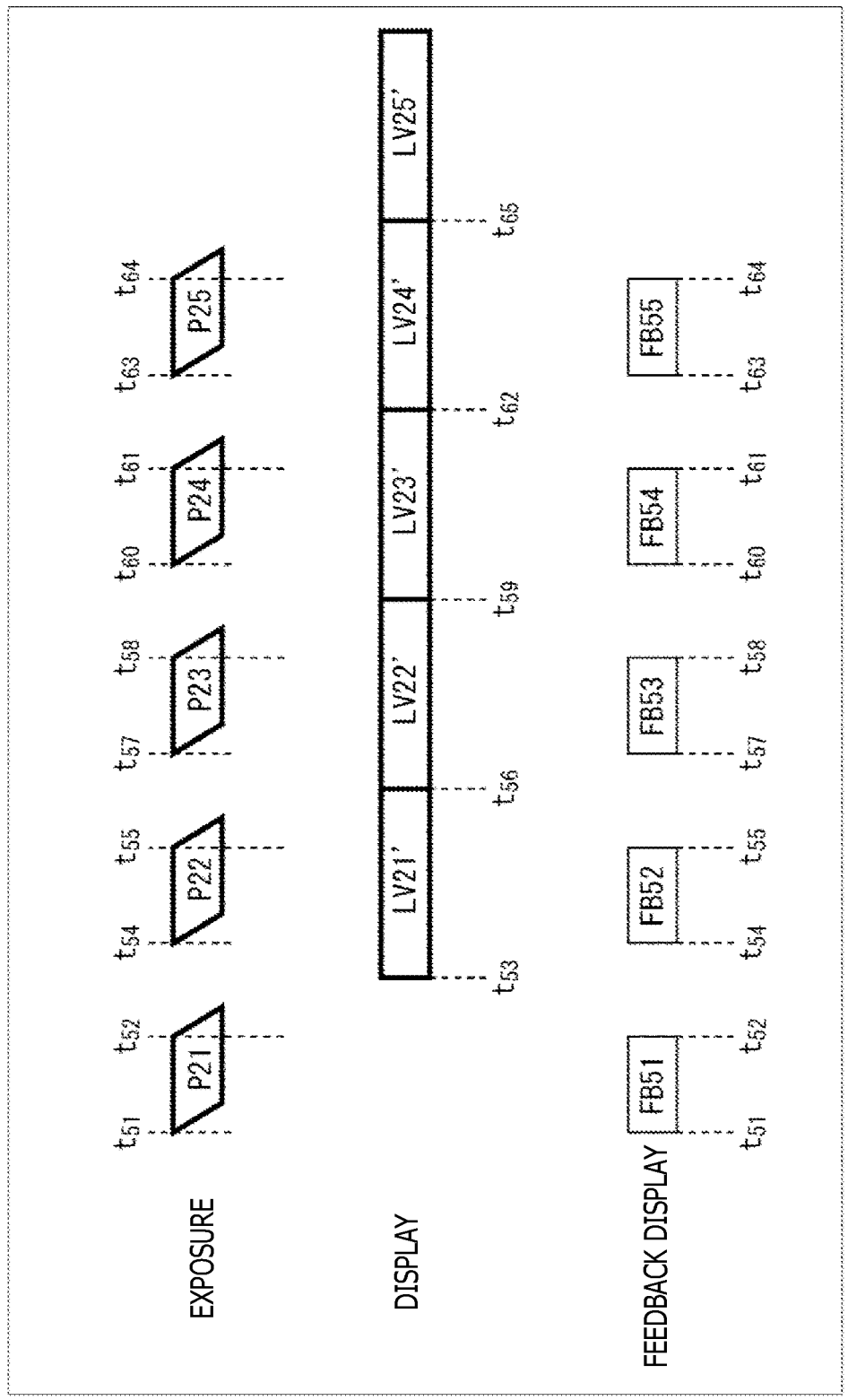
FIG. 13 is a diagram explaining timing of feedback display.

In case of continuous imaging, the marks 401 may be displayed in a blinking manner, for example. Described herein by way of example is a case where five images are captured during continuous imaging as depicted in FIG. 13. An image P21 is captured during an exposure time from time t51 to time t52. An image P22 is captured during an exposure time from time t54 to time t55. An image P23 is captured during an exposure time from time t57 to time t58. An image P24 is captured during an exposure time from time t60 to time t61. An image P25 is captured during an exposure time from time t63 to time t64.

It is assumed that the respective exposure times for exposing the images P21 to P25 are all set to a time longer than 40 msec. In this case, the feedback display time is set to the exposure time, wherefore feedback display is performed five times in correspondence with the respective times of imaging as depicted in FIG. 13, for example.

For example, as depicted in FIG. 13, display of feedback display FB51 starts from time t51 corresponding to the start of capturing of the image P21, and continues until time t52. Similarly, display of feedback display FB52 starts from time t54 corresponding to the start of capturing of the image P22, and continues until time t55.

By repeating similar feedback display, feedback display FB55 starts from time t63 corresponding to the start of capturing of the image P25, and continues until time t64.

In this manner, feedback display is performed five times. In this case, more specifically, feedback display is performed five times for five images of continuous imaging. Accordingly, the marks 401 are displayed in a blinking manner.

The blinking of the marks 401 gives a sense of continuous imaging to the photographer. Accordingly, similarly to the above example, execution timing of imaging and exposure time are also recognizable during continuous imaging according to the present technology.

In case of the blinking display of feedback display, the same mark may be displayed at the same position. Alternatively, the same mark may be shifted to a different display position (display position may be shifted for each blinking). Instead, a different mark may be displayed for each blinking. In this manner, display of the feedback display may be changed at the time of continuous imaging such that the user can more clearly recognize continuous imaging.

Note that, in case of continuous imaging, feedback display may be performed only at the start and end of the continuous imaging. As described above, the marks 401 are displayed in a blinking manner in case of continuous imaging. There is a possibility that this manner of display obstructs the view of the photographer.

Accordingly, when a continuous imaging mode is set, for example, the marks 401 may be displayed for a predetermined time, such as 40 msec or longer, in response to operation of an imaging button, and further displayed for a predetermined time, such as 40 msec or longer, at an end of operation of the operation button, or at the time when (or before) the number of images reaches the number of maximum images allowed to be captured.

Alternatively, feedback display may continue from the start to end of continuous imaging.

As described above, the display time, the number of times of display or the like of feedback may be controlled in a selected mode.

<Process at Exposure Start Time and End Time>

A process performed at exposure start time and end time is now described. A process performed at an exposure start is initially described with reference to a flowchart depicted in FIG. 14.

In step S201, it is determined whether or not feedback is currently displayed. When it is determined in step S201 that feedback is currently displayed, the process proceeds to step S202 to delete feedback display currently displayed (e.g., marks 401 depicted in FIG. 8).

In addition, in step S203, the timer is reset (set to 0). This timer is a timer for measuring a time of feedback display as described above.

When it is determined in step S201 that feedback is not currently displayed, or that processing in step S203 has been completed, the process proceeds to step S204.

In step S204, it is determined whether or not a focus mode is set to AF-C mode. The focus mode is selected from AF-C and AF-S modes, for example. The AF-C mode is a mode called continuous autofocus. In this mode, focusing continues during half-pressing of the shutter button.

The AF-S mode is a mode called single auto-focus. In this mode, focus is fixed during half-pressing of the shutter button once focusing is achieved by half-pressing of the shutter button.

When it is determined in step S204 that the focus mode is the autofocus mode, i.e., the AF-C mode, the process proceeds to step S205. In step S205, it is determined whether or not focusing has succeeded (focusing is achieved). When it is determined in step S204 that focusing has succeeded, the process proceeds to step S206.

In step S206, it is determined whether or not a focal position is currently displayed. When it is determined in step S206 that the focal position is currently displayed, the process proceeds to step S207. In step S207, feedback is displayed at a position following an AF frame. The AF frame is a frame displayed at a portion of an object in focus of autofocus (object in focus).

Figure 15:
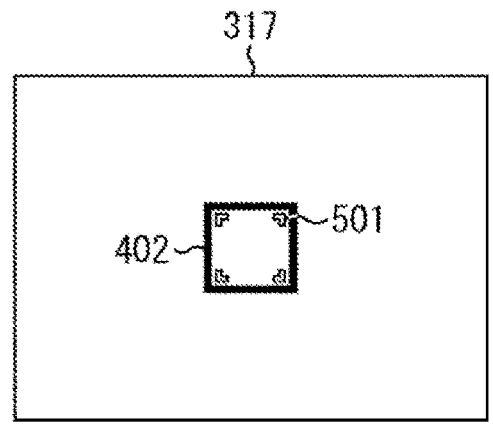
FIG. 15 is a diagram depicting an example of feedback display.

FIG. 15 is an example of a screen during feedback display at the position following the AF frame. In the example of the screen depicted in FIG. 15, a shape of square brackets displayed at a central portion of the display unit 317 corresponds to an AF frame 501. A mark 402 (feedback display) is provided in a square shape surrounding the AF frame 501. As depicted in FIG. 15, feedback display may be achieved by display of the mark 402 near the AF frame 501.

Also, according to the example depicted in FIG. 15, the AF frame 501 is displayed at the central portion of the display unit 317. In case of the AF-C mode, the AF frame 501 may shift, wherefore the display position of the mark 402 may shift in accordance with the shift of the AF frame 501. More specifically, the mark 402 is displayed at a position following the position of the AF frame 501.

This manner of display of the mark 402 following the AF frame 501 in the AF-C mode selected as the focus mode is adopted in consideration that the visual line of the photographer concentrates on a moving object in the AF-C mode. In the AF-C mode, the AF frame 501 is displayed on an object which is a moving object. Accordingly, the mark 402 is depicted near the AF frame 501 to display feedback in a region at which the photographer is gazing.

It is determined in step S204 whether or not the focus mode is the AF-C mode to achieve this manner of display.

Also, even in the AF-C mode, there is a high possibility that the object intended to be imaged by the photographer has not been captured when focusing fails. In this situation, control is executed such that feedback is not displayed.

It is determined in step S205 whether or not focusing has succeeded to control display in this manner.

Also, when the focal position is not displayed, that is, the AF frame 501 is not displayed even in the AF-C mode and in the state that focusing has succeeded, only the mark 402 is displayed. In this case, the photographer visually recognizes display of only the mark 402 all of a sudden, wherefore the photographer may have an uncomfortable feeling. In this situation, control is executed such that feedback is not displayed.

It is determined in step S206 whether or not the focal position has been displayed to control display in this manner.

In addition, when it is determined that the focal position has been displayed in the AF-C mode and in the state that focusing has succeeded, feedback is displayed at a position following the AF frame 501 as described above.

On the other hand, the process proceeds to step S208 when it is determined that the focus mode is not the AF-C mode in step S204, that focusing has not succeeded in step S205, or that the focal position is not displayed in step S206.

In step S208, feedback display is set to a fixed position. When feedback is displayed at the fixed position, this feedback display is achieved by display of the marks 401 at four corners of the display unit 317 (screen) as depicted in FIG. 8, for example. The example of feedback display depicted in FIG. 8 is an example of the marks 401 displayed at four corners of the screen. The marks 401 are displayed at the fixed positions within the screen rather than positions following the AF frame 501 (FIG. 15).

As described above, the display system of feedback display is changeable in accordance with the mode of autofocus. In other words, a plurality of display methods are adoptable for feedback display. Accordingly, an optimal display method can be selected from the plurality of display methods in accordance with the mode of autofocus to achieve display by using the selected display method.

In addition, in case of a configuration which selects an optimal method from a plurality of display methods, conditions for this selection may include a plurality of conditions such as whether or not imaging is continuous imaging, and whether or not exposure is long exposure, as well as the mode of autofocus.

Note that the plurality of display methods described herein by way of example are the method of displaying the marks 401 at four corners of the screen as depicted in FIG. 8, and the method of displaying the mark 402 following the AF frame 501 as depicted in FIG. 15. Other adoptable display methods will be described below.

Figure 14:
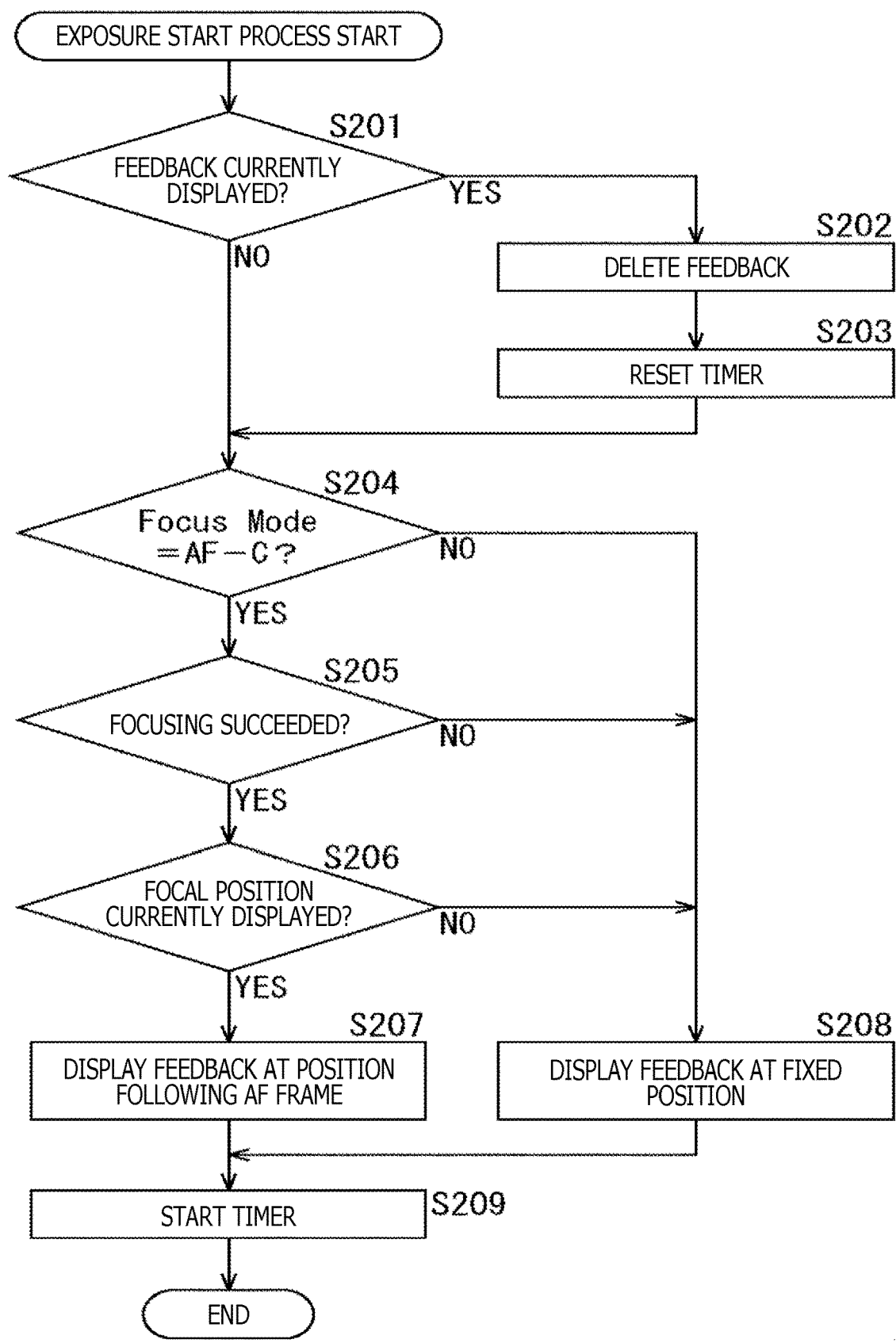
FIG. 14 is a flowchart explaining a process performed at an exposure start.

According to the example depicted in FIG. 14, feedback is displayed in a region at which the photographer is gazing when it is determined that such a region is present. When a region at which the photographer is gazing is not specified, feedback is displayed in a region not obstructing the photographer.

Returning to the description of the process depicted in the flowchart of FIG. 14, a feedback display system is set in step S207 or step S208. When feedback display based on this setting is started, the process proceeds to step S209.

In step S209, the timer starts measuring time. As described above, the timer is provided to continue feedback display for a certain time to secure visibility of feedback display when the exposure time is short, for example. According to the example described above, the timer measures 40 msec, for example.

At a start of exposure, the process depicted in FIG. 14 is executed to start feedback display. In addition, at an exposure end, a process is performed according to a flowchart depicted in FIG. 16.

In step S251, it is determined whether or not the timer is counting. When it is determined in step S251 that the timer is counting, the process at the exposure end is completed. More specifically, in the state that the timer is counting, feedback display continues even after the end of exposure.

On the other hand, when it is determined in step S251 that the timer is not counting, the process proceeds to step S252. In step S252, feedback display is deleted.

As described above, when time measurement by the timer continues at the end of exposure, feedback display continues. After the end of time measurement by the timer, feedback displayed at that time is deleted.

Figure 17:
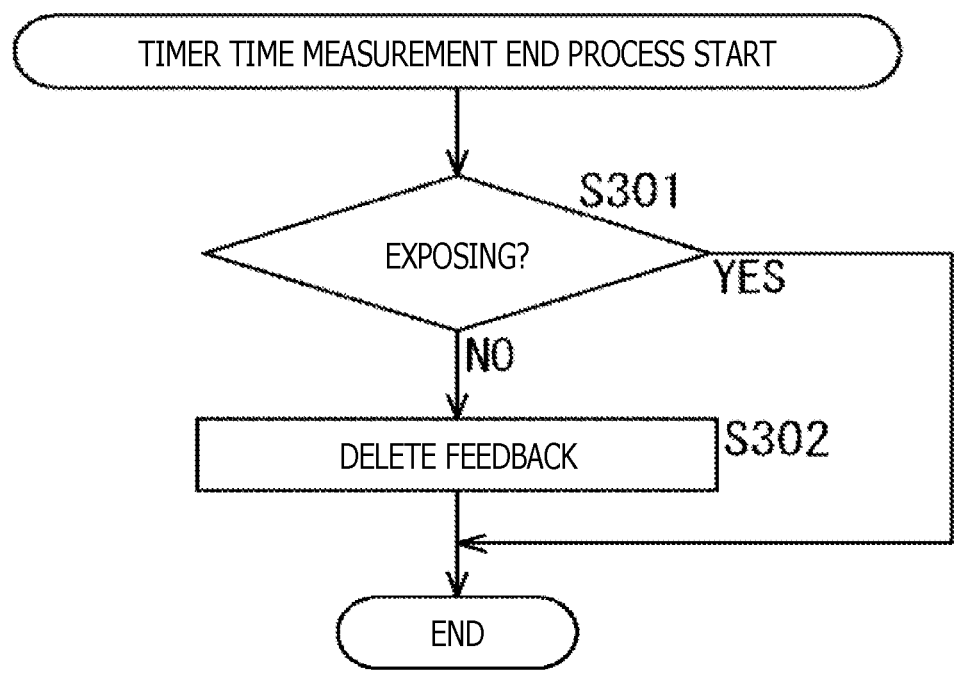
FIG. 17 is a flowchart explaining a process at an end of time measurement by a timer.

When feedback display is controlled on the basis of time measured by the timer in this manner, a process depicted in FIG. 17 is further executed. The flowchart depicted in FIG. 17 is a flowchart explaining a process performed at the end of time measurement by the timer.

In step S301, it is determined whether or not exposure is currently performed. When it is determined that exposure is currently performed at the end of time measurement by the timer, the process at the end of time measurement by the timer ends. In this case, exposure continues even after the end of time measurement by the timer, wherefore feedback display also continues.

On the other hand, when it is determined in step S301 that exposure is not currently performed, the process proceeds to step S302. In step S302, feedback display is deleted.

As described above, feedback display continues when exposure continues after the end of time measurement by the timer. When exposure ends, feedback displayed at that time is deleted.

As described with reference to the flowchart depicted in FIG. 9, a time of 40 msec is measured by the timer when feedback display time is set on the basis of the exposure time, specifically, when a setting is made such that feedback display continues for 40 msec in case of the exposure time of 40 msec or shorter. After an elapse of 40 msec, feedback display is deleted. In this case, feedback display is deleted by the process performed at the end of time measurement by the timer as depicted in FIG. 17.

Figure 16:
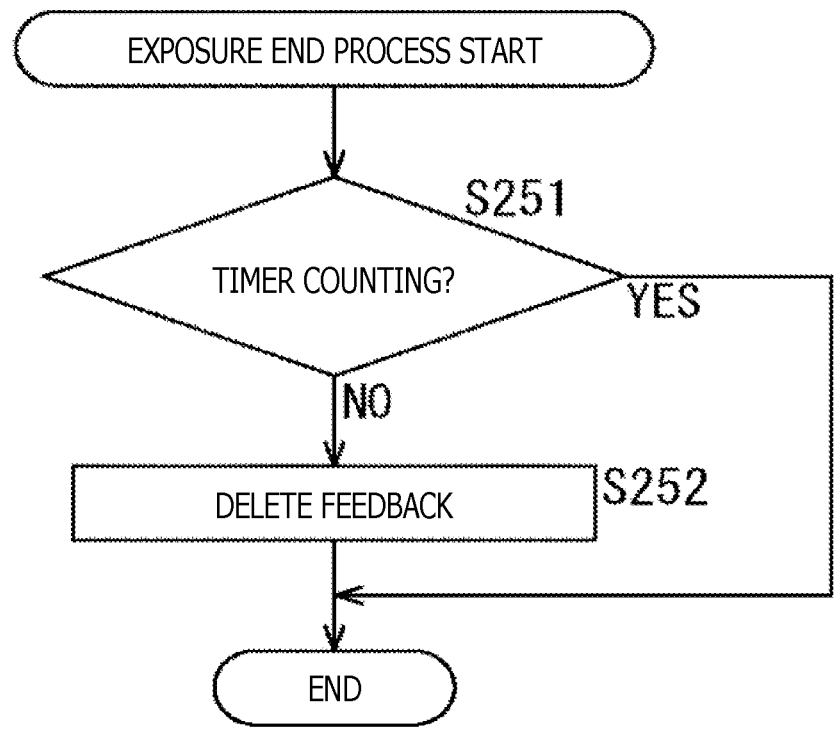
FIG. 16 is a flowchart explaining a process performed at an exposure end.

On the other hand, when the time of feedback display is set on the basis of the exposure time as described with reference to the flowchart depicted in FIG. 9, specifically, a setting is made such that feedback display continues for the exposure time in case of the exposure time of 40 msec or longer, feedback display is deleted at the end of the exposure time. In this case, feedback display is deleted by the process performed at the end of the exposure as depicted in FIG. 16.

<Feedback Display Position Setting Process>

A process for setting a display position of feedback is described with reference to a flowchart depicted in FIG. 18. As described with reference to the flowchart of the process performed at the start of exposure in FIG. 14, feedback is displayed while following the AF frame 501 (FIG. 15), or at a fixed position rather than the position following the AF frame 501. Selection of the following display or the fixed display can be made in the manner described with reference to FIG. 14, or in a manner depicted in the flowchart of FIG. 18.

In step S401, the feedback display position is set to a fixed position. More specifically, in this case, the feedback display position is set to the fixed position as default.

In step S402, it is determined whether or not the focus mode is the AF-C mode. In step S403, it is determined whether or not focusing has succeeded. In step S404, it is determined whether or not a focal position has been displayed. Processing in steps S402 to S404 is basically identical to processing in step S204 to S206 of the flowchart depicted in FIG. 14, wherefore description of this processing is not repeated herein.

When the focus mode is the AF-C mode in the state that focusing has succeeded, and that the focal position is currently displayed, the feedback display position is set to a position following the AF frame in step S405. More specifically, when it is determined that a region at which the photographer is gazing is present as described with reference to FIG. 14, a setting is made such that feedback is displayed in that region.

Figure 18:
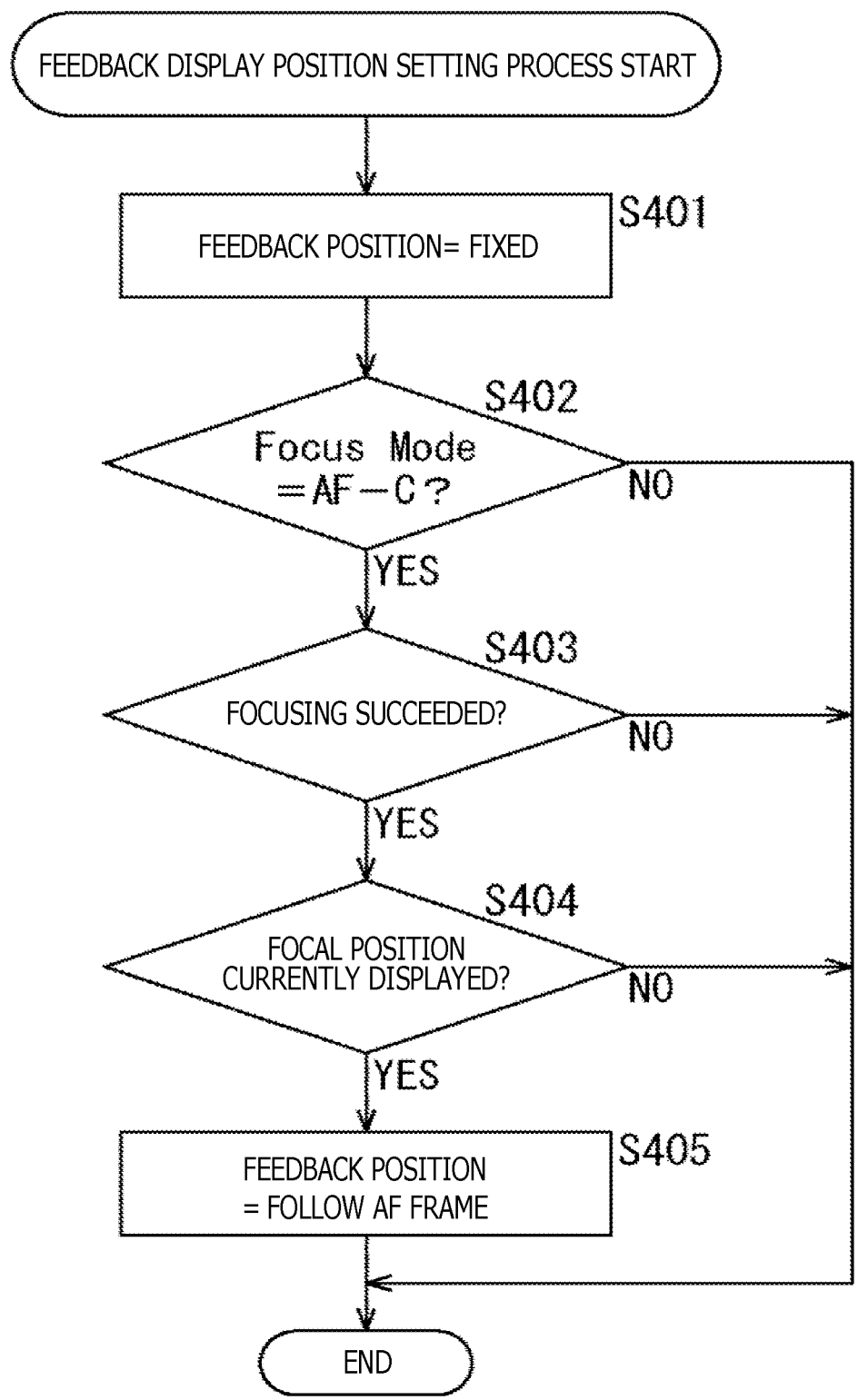
FIG. 18 is a flowchart explaining a display position setting process.

According to the process of the flowchart depicted in FIG. 18, the feedback display position is set to the fixed position as default. However, when it is determined that a region at which the photographer is gazing is present, feedback is displayed in that region.

The feedback display position may be set in this manner.

Note that, according to the example described above, the position of feedback display and the display contents are changed under predetermined conditions. However, the position of feedback display and the display contents may be changed under conditions other than the above conditions.

Moreover, rather than setting the conditions described above, the same feedback may be displayed without change.

<Other Examples of Feedback Display>

Feedback display according to the embodiment has been described with reference to FIGS. 8 and 15. Other types of feedback display are further described.

Figure 19:
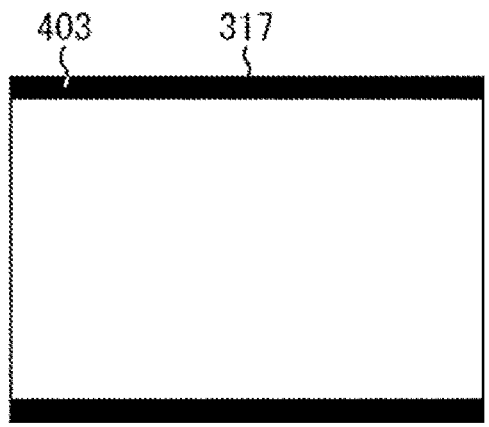
FIG. 19 is a diagram depicting an example of feedback display.

FIG. 19 is a diagram depicting a different display example of feedback display. The feedback display depicted in FIG. 19 includes linear marks 403 on upper and lower sides of the screen.

When the linear marks 403 are displayed on the upper and lower parts of the screen, a central portion of the screen constantly displays a captured image even during feedback display. Accordingly, display of the marks 403 does not obstruct the photographer.

Moreover, when the marks 403 are displayed, the photographer can recognize imaging timing and exposure time similarly to the above embodiment. Accordingly, the photographer can sense current execution of imaging.

A line width of each of the linear marks 403 is set to a width not obstructing the photographer and sufficient for securely executing feedback. Also, the width of the mark 403 displayed on the upper side and the width of the mark 403 displayed on the lower side may be equalized, or set such that one of the widths is larger than the other width.

Also, in the feedback display depicted in FIG. 19, the linear mark 403 is displayed on each of the upper side and the lower side of the screen. However, the linear mark 403 may be displayed on each of left side and right side of the screen.

The linear marks 403 displayed on the upper side and lower side of the screen, and the linear marks 403 displayed on the left side and right side of the screen may be switched in accordance with the orientation of the imaging device. For example, when the screen is landscape-oriented (imaging device is horizontally held), the linear marks 403 may be displayed on the upper side and lower side of the screen. When the screen is portrait-oriented (imaging device is vertically held), the linear marks 403 may be displayed on the left side and right side of the screen. In this manner, the feedback display may be switched in accordance with the orientation of the imaging device.

Figure 20:
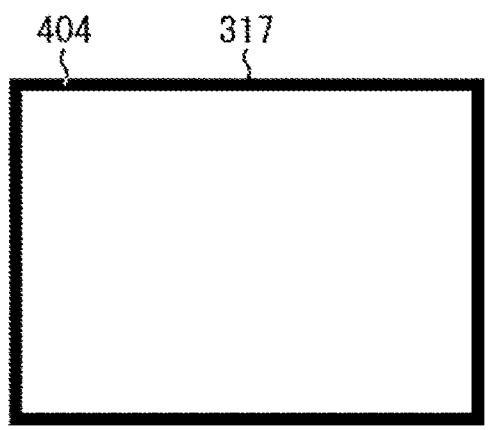
FIG. 20 is a diagram depicting an example of feedback display.

FIG. 20 is a diagram depicting a different display example of feedback display. The feedback display depicted in FIG. 20 includes linear marks 404 on the upper side, lower side, left side, and right side of the screen to constitute a square shape of the marks 404. In other words, the marks 404 to be displayed form a shape identical to the shape of the display frame of the screen (display unit 317), and are each drawn in a line having a predetermined width (in a shape following the frame of the screen) at a position following the frame of the screen.

When the marks 404 are displayed at the position following the frame of the screen in this manner, the central portion of the screen can constantly display a captured image. Accordingly, display of the marks 404 does not obstruct the photographer.

Moreover, when the marks 404 are displayed, the photographer can recognize imaging timing and exposure time similarly to the above embodiment. Accordingly, the photographer can sense current execution of imaging.

A line width of each of the marks 404 is set to a width not obstructing the photographer and sufficient for securely executing feedback. Also, the respective widths of the marks 404 displayed on the respective sides may be equalized or made different. For example, in a configuration that the respective widths of the lines displayed on the left side and right side are equalized, and that the respective widths of the lines displayed on the upper side and lower side are equalized, the widths of the lines displayed on the left side and right side may be made different from the respective widths of the lines displayed on the upper side and the lower side.

Figure 21:
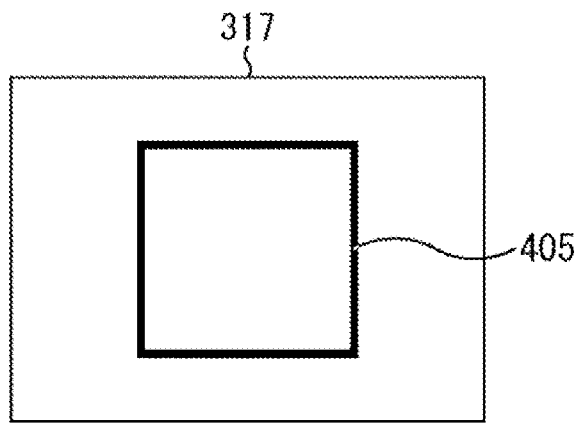
FIG. 21 is a diagram depicting an example of feedback display.

The marks 404 displayed on side walls within the screen in FIG. 20 may be displayed near the center within the screen as depicted in FIG. 21. FIG. 21 is a diagram depicting a different display example of feedback display. The feedback display depicted in FIG. 21 includes a square mark 405 within the screen.

When the mark 405 is displayed within the screen in this manner, a region other than the mark 405 within the screen can constantly display a captured image even during feedback display. In this case, display of the mark 405 does not obstruct the photographer. However, the mark 405 may obstruct the photographer if the width of the line of the mark 405 increases. Accordingly, the width of the line of the mark is made smaller than the width of the line of each of the marks 404 (FIG. 20), for example.

As described above, the width of the mark displayed as feedback display may be varied in accordance with the display position. Also, in the configuration varying the width of the mark in accordance with the display position, the width at a position closer to the central portion of the screen may be made smaller, while the width at a position away from the central portion of the screen may be made larger.

On the other hand, when the mark 405 is displayed, the photographer can recognize imaging timing and exposure time similarly to the above embodiment. Accordingly, the photographer can sense current execution of imaging.

Figure 22:
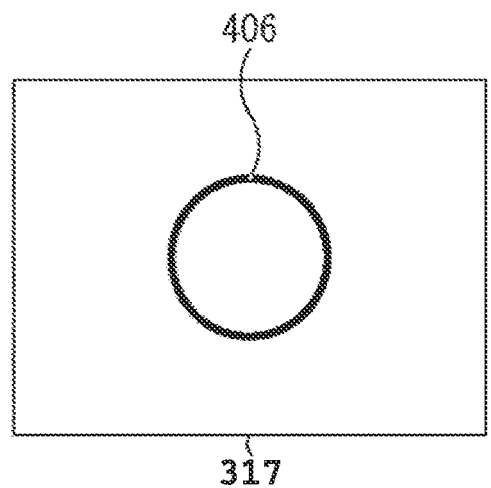
FIG. 22 is a diagram depicting an example of feedback display.

While the mark 405 depicted in FIG. 21 has a square shape, a circular mark 406 depicted in FIG. 22 may be adopted.

When feedback is displayed at the central portion of the screen as depicted in FIGS. 21 and 22, the shape of the feedback display (shape of mark) may be either square as depicted in FIG. 21, or may be circular as depicted in FIG. 22. Also, while not depicted in the figures, the shape of the feedback display may be a polygonal shape, for example, rather than square and circular shapes.

Figure 23:
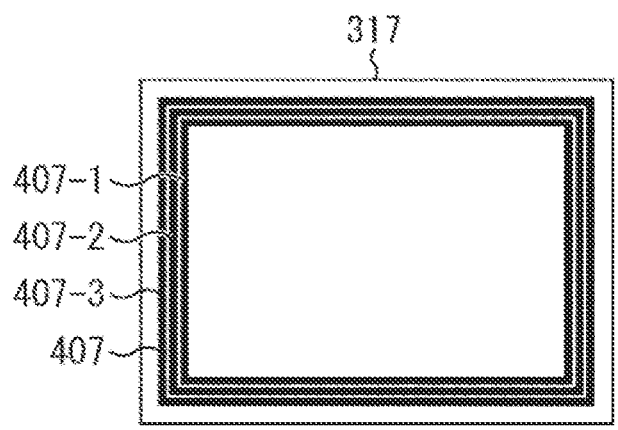
FIG. 23 is a diagram depicting an example of feedback display.

Also, as depicted in FIG. 23, a plurality of marks 407 each having the same shape may be displayed. The marks 407 depicted in FIG. 23 to be displayed are constituted by three square shapes which are concentric and have different sizes. Note that, similarly to the above examples, each shape may be circular, polygonal or other shapes as well as the square shape.

In this manner, a plurality of figures having the same shape may be displayed as feedback display.

Also, according to the example depicted in FIG. 23, the marks 407 constituted by three square figures which are concentric and have the same size are simultaneously displayed. However, each of the marks 407 may be displayed at different timing. In other words, feedback display may be displayed as moving images as well as still images.

For example, in case of the square marks in FIG. 23 described herein by way of example, a mark 407-1 is displayed at time t1, and deleted at time t2. A mark 407-2 is displayed at time t2, and deleted at time t3. A mark 407-3 is displayed at time t3.

In this manner, the marks 407 may be displayed while gradually shifted outward from the center of the screen. Alternatively, the marks 407 may be displayed while gradually shifted toward the center from respective ends of the screen.

Instead, the mark 407-1 may be displayed at t1, the mark 407-2 may be additionally displayed at time t2, and the mark 407-3 may be additionally displayed at time t3.

Figure 24:
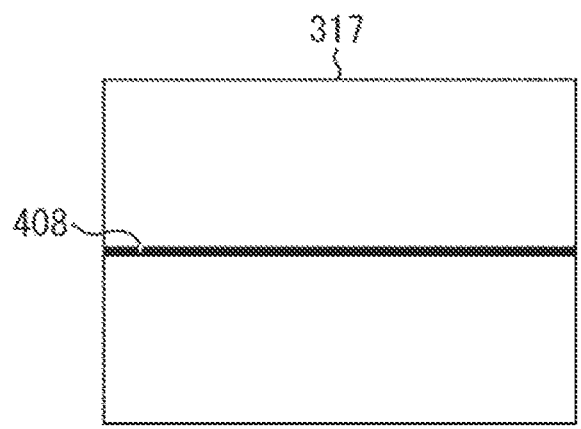
FIG. 24 is a diagram depicting an example of feedback display.

FIG. 24 is a diagram explaining further different display of feedback. The feedback display depicted in FIG. 24 is a horizontal bar displayed at the central portion of the screen as a mark 408. As depicted in FIG. 24, the linear mark 408 may be displayed within the screen. Also, the direction of the line may be either horizontal or vertical in the screen.

Figure 25:
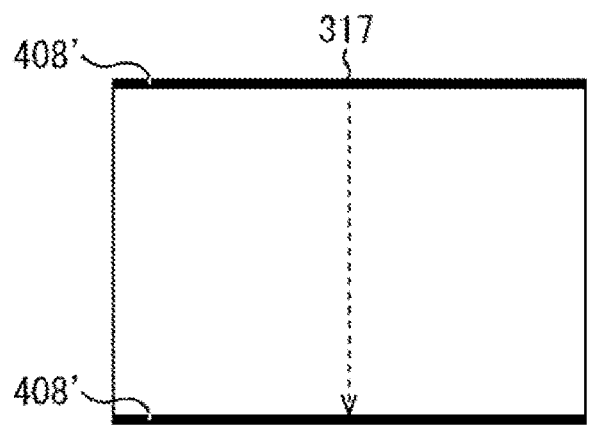
FIG. 25 is a diagram depicting an example of feedback display.

Also, the mark 408 may be displayed either as a still image at the position depicted in FIG. 24, or as a moving image as depicted in FIG. 25. When the mark 408 is displayed as a moving image, a linear mark 408' having a linear shape extending in the horizontal direction may be displayed while shifted from the upper side of the screen toward the lower side with an elapse of time, for example. Alternatively, the linear mark 408 (not depicted) extending in the horizontal direction may be displayed while gradually shifted from the lower side of the screen toward the upper side with an elapse of time.

Also, for example, a shift time of the linear mark 408' shifting from the upper side toward the lower side of the screen may be set to a time equivalent to an exposure time, or 40 msec in the example described above. Note that the shift time of the feedback display shifting a predetermined figure such as the mark 408 may be a definite time (fixed time) regardless of the exposure time.

Figure 26:
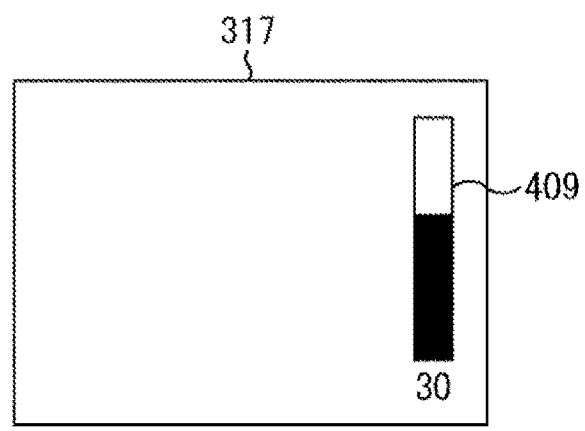
FIG. 26 is a diagram depicting an example of feedback display.

FIG. 26 is a diagram explaining further different display of feedback display. The feedback display depicted in FIG. 26 includes an indicator displayed in a lower portion of the screen as a mark 409. In case of continuous imaging, for example, the mark 409 may be displayed as an indicator.

A length of the indicator indicates the maximum number of images during continuous imaging (length indicating residual volume of buffer). According to the example depicted in FIG. 26, for example, a gauge to be displayed shifts from the lower side to the upper side in the figure with an increase in the number of captured images. The gauge having reached the upper end indicates that the maximum number of images has been captured. Also, a numerical value indicating the number of remaining images is displayed below the indicator. The user can intuitively recognize continuous imaging currently executed, and the number of remaining images by visual recognition of the mark 409 (numerical value).

Note that the numerical value is a numeral indicating the number of captured images or the number of remaining images, and may be displayed at a predetermined position of the screen rather than below the indicator. In addition, only the numerical value may be displayed as feedback display, or only the indicator may be displayed as feedback display.

Figure 27:
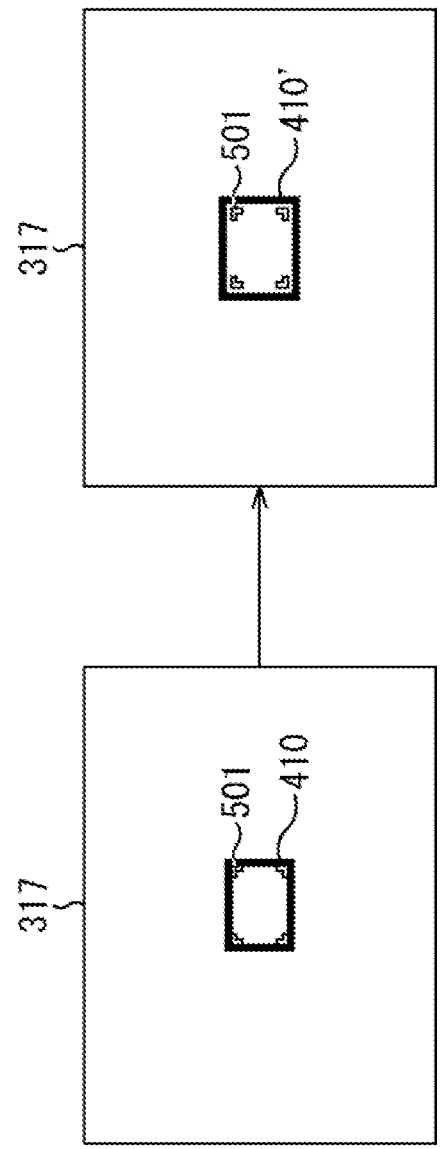
FIG. 27 is a diagram depicting an example of feedback display.

Also, feedback display may be performed in a manner depicted in FIG. 27. As depicted in a left part of FIG. 27, a frame 410 having substantially the same size as the size of the AF frame 501 is displayed during exposure. In addition, after exposure, display is switched to a frame 410' slightly larger than the AF frame 501 as depicted in a right part of FIG. 27.

In this case, more specifically, feedback display is performed such that the frame 410 displayed during exposure is switched to the frame 410' slightly expanded from the frame 410 after exposure. Switching from the frame 410 to the frame 410' may be displayed in a manner of animation display.

Note that, according to the example depicted in FIG. 27, the AF frame 501 is displayed, and the frame 410 in the size corresponding to the size of the AF frame 501 is displayed. However, the frame 410 may be displayed in a fixed size or at a predetermined position regardless of the size and position of the AF frame 501.

Also, while not depicted in the figure, the displayed frame 410 may fade out in animation display.

This manner of display provides expression of an afterimage, thereby achieving display with high visibility when the exposure time is short, or display with enhanced expression effect.

The example of feedback display following the AF frame 501 has been described with reference to FIG. 15, where the one AF frame 501 is displayed. However, a plurality of the AF frames 501 may be displayed with a plurality of objects in focus.

Figure 28:
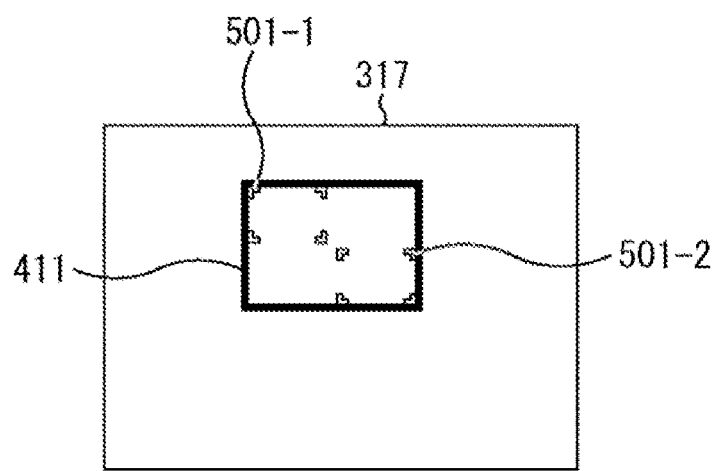
FIG. 28 is a diagram depicting an example of feedback display.

When a plurality of the AF frames 501 are displayed, the frame 402 (FIG. 15) may be displayed for each of the plurality of AF frames 501, or a frame surrounding the plurality of AF frames 501 may be displayed as depicted in FIG. 28.

Feedback display depicted in FIG. 28 includes display of an AF frame 501-1 and an AF frame 501-2, and display of a frame 411 in a square shape surrounding the AF frame 501-1 and the AF frame 501-2. When the plurality of AF frames 501 are displayed in this manner, feedback may be displayed by using the frame 411 surrounding the AF frames 501.

Moreover, as described with reference to FIG. 27, the frame 411 may be displayed during exposure, and slightly expanded and displayed after exposure.

According to the embodiment described above, the frame such as the frame 411 (FIG. 28) is displayed in a solid line. However, the frame may be displayed in a line of a type other than a solid line, such as a broken line and an alternate long and short dash line.

The marks described above are displayed on the screen as feedback display. Also, marks other than the marks described above, such as a moving image which presents an image of a front curtain or a rear curtain of a shutter, may be displayed as feedback display.

Also, the above-described marks to be displayed may be selected under predetermined conditions. For example, when an image of a landscape or a portrait is captured, feedback display which does not show a mark at the central portion of the screen, such as the marks 401 depicted in FIG. 8, the marks 403 depicted in FIG. 19, and the marks 404 depicted in FIG. 20, is selected with priority given to visibility of an object, for example.

Also, when an image of a moving body is captured, for example, feedback display as a mark following the AF501, such as the mark 402 depicted in FIG. 15, or a mark depicted at the central portion of the screen, such as the mark 405 depicted in FIG. 21 and the mark 406 depicted in FIG. 22, is selected with priority given to recognition of feedback display, for example.

Note that the mark 405 (mark 406) depicted in FIGS. 21 and 22 may be displayed as a mark following the AF frame 501.

Also, feedback display matching with preference of the user may be selected and set by the user.

While no description about colors of the marks (colors of feedback display) is made in the embodiment described above, the colors of the marks may be either black as depicted in the figures, or colors other than black. Alternatively, the colors may be transparent colors. When feedback display is presented in transparent colors, through images are allowed to be seen through. Accordingly, feedback display can be achieved in a state that an object is visually recognizable with ease.

The color of feedback display may be either a fixed color (e.g., black) or a variable color. When a variable color is adopted, the color of the marks may be set in accordance with an image currently captured, for example. When luminance of the image currently captured is high, the mark may be displayed in black. When luminance of the image currently captured is low, the marks may be displayed in white, for example.

Also, according to the embodiment described by way of example, the screen is landscape-oriented (imaging device is horizontally held). However, the present technology is applicable to a portrait-oriented screen (imaging device is vertically held).

Also, different manners of feedback display may be adopted for the imaging device horizontally held and for the imaging device vertically held, or the same manner of feedback display may be adopted for both of these imaging devices.

For example, when the linear mark 408 depicted in FIG. 25 is displayed as a moving image in the horizontally held device, the mark 408 shifts in the up-down direction (e.g., from lower side to upper side). In case of the imaging device vertically held, the mark 408 to be displayed shifts in the up-down direction in the screen vertically held.

In this case, the same manner of feedback display is adopted for the imaging device horizontally held and the imaging device vertically held in the point that the mark 408 shifts in the up-down direction. The up-down direction in the vertically held state corresponds to the left-right direction in the horizontally held state. Accordingly, as viewed from the horizontally held state, the mark 408 shifts in different directions, wherefore different manners of feedback display are adopted in this point.

Alternatively, the mark 408 to be displayed may be shifted in the left-right direction in the screen vertically held.

In this case, different manners of feedback display are adopted for the imaging device horizontally held and the imaging device vertically held in the point that the mark 408 shifts in the left-right direction. The left-right direction in the vertically held state corresponds to the left-right direction in the horizontally held state. Accordingly, as viewed from the horizontally held state, the mark 408 shifts in the same direction, wherefore the same manner of feedback display is adopted in this point.

The feedback display described above (marks 401 to 409) may be used either independently or in combination. For example, only the feedback depicted in FIG. 8 (marks 401) may be displayed, or the feedback depicted in FIG. 8 (mark 401) and the feedback depicted in FIG. 15 (mark 402) may be displayed while divided under predetermined conditions.

More specifically, a plurality of types of feedback display may be prepared and selectively used. Also, a plurality of types of feedback display may be simultaneously performed. For example, feedback display simultaneously depicting the marks 401 and the mark 405 may be adopted.

Note that a pseudo shutter sound may be emitted during the feedback display described above.

Note that pseudo display of blackout may be generated as feedback display of a type different from the marks described above. For example, pseudo blackout may be generated by superimposing a black screen on a screen of an image currently captured similarly to superimposition of the marks on the screen of the image currently captured.

In this manner, pseudo blackout can be presented to the user familiar with blackout conventionally generated.

According to the example described above, feedback is displayed as the marks depicted in a part of the screen. However, feedback may be displayed on the entire screen. For example, brightness or chroma of the entire screen may be raised or lowered to achieve feedback display. In other words, the entire screen may be made brighter or darker, displayed in monochrome, or reversed in colors to display feedback and give a sense of imaging to the user.

According to the example described above, feedback is displayed on a live view image. However, feedback may be displayed in a region where a live view image is not displayed within the display unit, or may be displayed on a display unit dedicated for feedback display.

The marks displayed as feedback display described above, pseudo shutter sound, pseudo blackout and the like may be set in accordance with preferences of the user, and presented as feedback display on the basis of these settings. Moreover, the plurality of types of feedback display may be combined or switched in accordance with the settings from the user.

An example of switching between a plurality of types of feedback display is hereinafter described. Presented herein is an example of switching between pseudo blackout (hereinafter referred to as black image) and the marks 401 depicted in FIG. 8 in the types of feedback display described above. Also, capturing only one image is referred to as single imaging, while continuous capturing of a plurality of images is referred to as continuous imaging.

Described herein with reference to FIG. 29 is an example where feedback display for the first image, and feedback display for the second and later images (or feedback display for first and later images in a different setting) can be independently set during continuous imaging.

The user can select any of combinations of settings for display of the black image (ON), for non-display of the black image (OFF), for display of the marks 401 (ON), and for non-display of the marks 401.

When the user sets display of the black image to on-state, and sets display of the marks 401 to on-state as depicted in FIG. 29, the black image is displayed for feedback display during capturing of the first image in both single imaging and continuous imaging. Also, when the second and later images are captured in continuous imaging, the marks 401 are displayed for feedback display.

Also, when the user sets display of the black image to on-state, and sets display of the marks 401 to off-state as depicted in FIG. 29, the black image is displayed for feedback display during capturing of the first image in both single imaging and continuous imaging. Also, feedback display is not depicted when the second and later images are captured in continuous imaging.

Also, when the user sets display of the black image to off-state, and sets display of the marks 401 to on-state as depicted in FIG. 29, the marks 41 are displayed for feedback display during capturing of the first image in both single imaging and continuous imaging. Also, when the second and later images are captured in continuous imaging, display of the marks 401 continues for feedback display similarly to capturing of the first image.

When the user sets display of the black image to off-state, and sets display of the marks 401 to off-state as depicted in FIG. 29, feedback display is not depicted.

In this manner, the user can selectively set feedback display. Also, as described above by way of example, different types of feedback display may be adopted for feedback display during capturing of the first image and feedback display during capturing of the second and later images in continuous imaging.

Moreover, a black image, i.e., pseudo blackout of feedback display during capturing of the first image gives the user a sense of imaging which follows a conventional imaging sense.

Also, a black image of feedback display during capturing of the first image gives the user a more clear sense of imaging of the first image (imaging timing of first image).

Described herein by way of example is display of the marks 401. Needless to say, any marks desired by the user may be selected. For example, a selection screen through which one of a plurality of types of feedback display is selectable is presented to the user such that the user can select desired feedback display through the selection screen.

The feedback display described above may be presented in a form of an application. Also, this application may be an application for a portable terminal such as a smartphone. Described herein is an example which performs the feedback display described above in an application of a smartphone.

Figure 30:
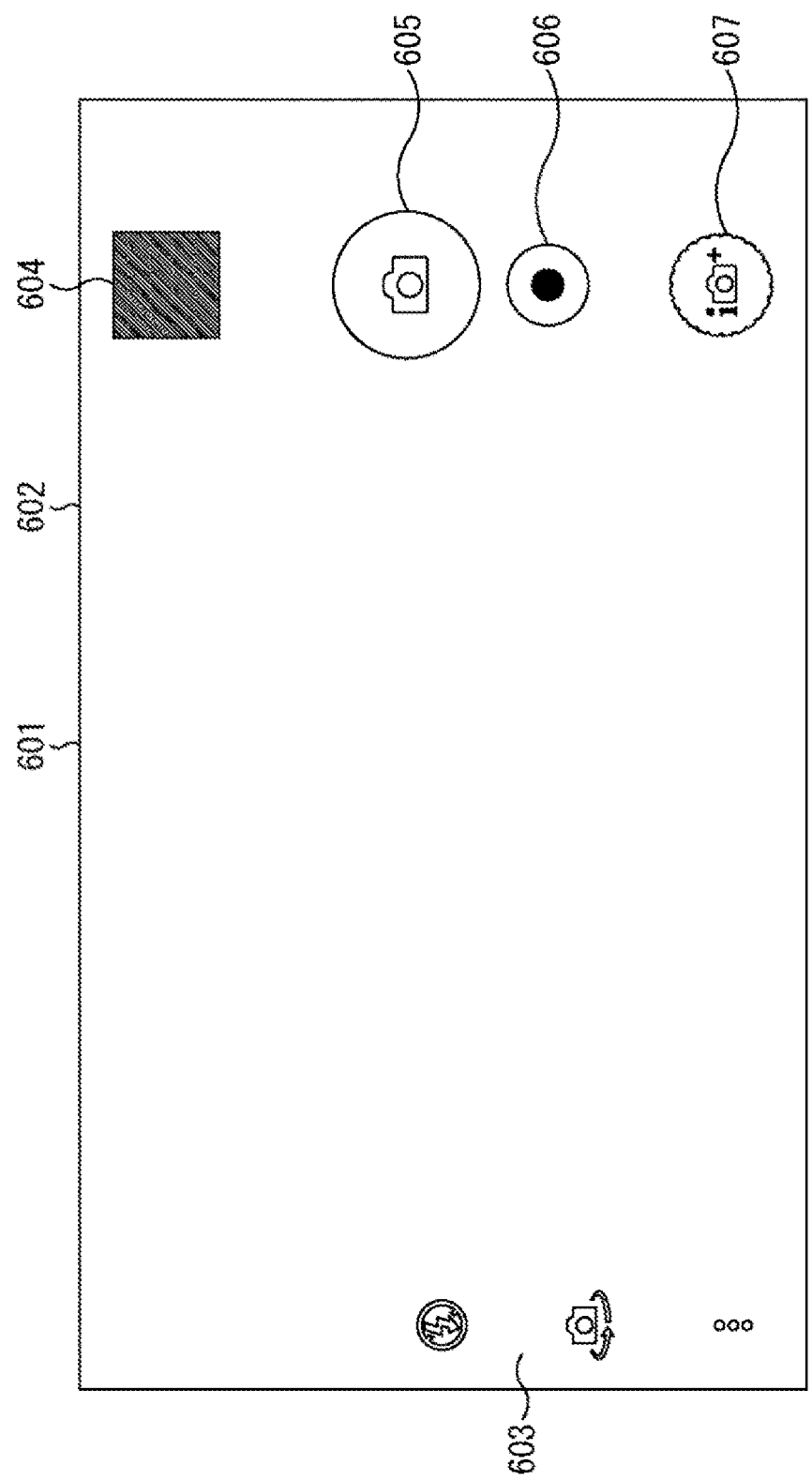
FIG. 30 is a diagram explaining an application to a smartphone.

FIG. 30 is a diagram depicting a screen example when a camera application of a smartphone is started. A display unit 601 of the smartphone includes an image display unit 602 which displays an image of an object currently captured.

FIG. 30 depicts the image display unit 602 in a size equivalent to the size of the display unit 601. The image of the object currently captured, which is not depicted in FIG. 30, is depicted on the entire display unit 601. The display unit 601 includes a touch panel.

For example, the display unit 601 displays imaging setting icons 603 each indicating a condition set during imaging (e.g., unavailability or availability of flash), for example. Moreover, a thumbnail image 604 previously captured, a shutter button 605, a video recording start button 606, an imaging mode setting icon 607 operated during imaging mode setting, and others.

When the user operates the shutter button 605 or a physical shutter button (not depicted) in a state that the foregoing screen is displayed on the display unit 601 of the smartphone, imaging is executed. Alternatively, imaging may be performed in response to a touch within the display unit 601 (touch panel) instead of the use of these shutter buttons. Also, these settings may be made by the user. Furthermore, a touch for a period (long press on screen) may be regarded as a continuous imaging mode which achieves continuous imaging.

Also, when imaging is performed in a manner depicted in FIG. 31, feedback indicating this imaging is displayed. The example depicted in FIG. 31 corresponds to the example of feedback display depicted in FIG. 8. Note that the feedback display of FIG. 8 is depicted at each of four corners of the screen. However, the feedback display of FIG. 8 may be depicted either at positions other than the four corners, or at the four corners of the screen as described with reference to FIG. 8. The display positions may be set to positions desired by the user.

Note that feedback other than the feedback in FIG. 8 may be displayed, or feedback may be selected by the user or switched between a plurality of types of feedback display as described above. Also, while continuous imaging is being executed in response to a long press on the screen, the feedback in the continuous imaging mode is displayed as described above.

As described above, the present technology is also applicable to a portable terminal device such as a smartphone.

According to the present technology, therefore, followability to an object improves by preventing generation of blackout. Even in a situation where no blackout is generated, the user can receive feedback concerning shutter timing and exposure time. These advantages considerably expand chances for imaging.

Moreover, the user can perform imaging without generating blackout, and securely receive feedback concerning shutter operation. The user can obtain a sense of innovative usability together with a conventional sense of imaging, and therefore obtain a further enhanced sense of imaging.

Note that a device to which the present technology described above is applied may be a device configured similarly to the imaging device 300 depicted in FIG. 5, or a device having a different configuration. For example, the present technology is applicable to a device which includes the display unit 317 (FIG. 5) constituted by a display which is constituted by a touch panel.

In addition, the present technology is applicable to a device which includes the operation unit 314 (FIG. 5) provided separately from other parts (imaging unit imaging) constituting the imaging device 300. For example, the present technology is also applicable to a device configured to perform remote operation of the imaging unit by using an operation unit.

Also, when the present technology is applied to a device capable of performing remote operation, feedback display described above is executed by the operation unit. Feedback and live view images described above can be displayed on a display unit provided on the operation unit.

In addition, the device capable of performing remote operation may require a time not required by a device which does not perform remote control, such as a time for communication between the operation unit and the imaging unit, and a time required for performing a process associated with this communication. More specifically, there is a possibility that the device performing remote operation produces a time lag. Accordingly, this type of device may display blackout similarly to a conventional device.

The present technology is applicable not only to a device including one imaging unit, but also to a device including a plurality of imaging units. For example, the present technology is applicable to a device which includes a plurality of imaging units operated by one operation unit. Also, the operation unit described herein may be constituted by a portable terminal such as a smartphone and a tablet type terminal.

<Recording Medium>

A series of processes described above may be executed by either hardware or software. When the series of processes are executed by software, programs constituting the software are installed in a computer. The computer used herein is a computer incorporated in dedicated hardware, or a general-purpose personal computer capable of executing various types of functions under various types of programs installed in the computer, for example.

FIG. 32 is a block diagram depicting a configuration example of hardware of a computer which executes the series of processes described above under programs. A CPU (Central Processing Unit) 1001, a ROM (Read Only Memory) 1002, and a RAM (Random Access Memory) 1003 in the computer are connected to each other via a bus 1004. An input/output interface 1005 is further connected to the bus 1004. An input unit 1006, an output unit 1007, a storage unit 1008, a communication unit 1009, and a drive 1010 are connected to the input/output interface 1005.

The input unit 1006 is constituted by a keyboard, a mouse, a microphone and the like. The output unit 1007 is constituted by a display, a speaker and the like. The storage unit 1008 is constituted by a hard disk, a non-volatile memory and the like. The communication unit 1009 is constituted by a network interface and the like. The drive 1010 drives a removable medium 1011 such as a magnetic disk, an optical disk, a magneto-optical disk, or a semiconductor memory.

According to the computer configured as above, the CPU 1001 loads the programs stored in the storage unit 1008 into the RAM 1003 via the input/output interface 1005 and the bus 1004, and executes the loaded programs to perform the series of processes described above.

The programs executed by the computer (CPU 1001) may be recorded in the removable medium 1011 such as a package medium, and provided in the form of the removable medium 1011, for example. Alternatively, the programs may be provided via a wired or wireless transmission medium, such as a local area network, the Internet, and digital satellite broadcasting.

The programs may be installed from the removable medium 1011 attached to the drive 1010 into the storage unit 1008 of the computer via the input/output interface 1005. Alternatively, the programs may be received by the communication unit 1009 via a wired or wireless transmission medium, and installed in the storage unit 1008. The programs may be also installed in the ROM 1002 or the storage unit 1008 in advance.

Note that the programs executed by the computer may be programs under which processes are performed in time series in the order described in the present description, or programs under which processes are performed in parallel or at necessary timing such as an occasion of a call.

Also, in the present description, a system refers to an entire apparatus constituted by a plurality of devices.

Note that advantageous effects to be produced are not limited to the advantageous effects described in the present description presented only by way of example, but include other advantageous effects.

Note that embodiments according to the present technology are not limited to the embodiment described herein, but include embodiments modified in various manners without departing from subject matters of the present technology.

Note that the present technology may have following configurations.

(1)

A control apparatus including:

a processing unit configured to process data based on pixel signals output from a plurality of pixels; and a display control unit configured to control a display unit to display an image based on the data processed by the processing unit as a through image, in which the display unit displays a mark indicating a recording process in response to an instruction of recording the data together with the through image displayed on the display unit.

(2)

The control apparatus according to (1) described above, in which the mark is displayed at each of four corners of the display unit.

(3)

The control apparatus according to (1) or (2) described above, in which the mark is displayed near a frame of autofocus.

(4)

The control apparatus according to any one of (1) to (3) described above, in which the mark is linearly displayed in each of upper and lower parts of the display unit.

(5)

The control apparatus according to any one of (1) to (4) described above, in which the mark is displayed in a shape along a frame of the display unit.

(6)

The control apparatus according to any one of (1) to (5) described above, in which the mark is displayed in a predetermined shape in which center of the predetermined shape is located at a center of the display unit.

(7)

The control apparatus according to any one of (1) to (6) described above, in which a plurality of the marks are displayed in figures each having a predetermined shape in which a center of the figures is located at a center of the display unit.

(8)

The control apparatus according to any one of (1) to (7) described above, in which the mark is a still image.

(9)
The control apparatus according to any one of (1) to (8) described above, in which
the mark is a moving image.
(10)
The control apparatus according to any one of (1) to (9) described above, in which
the mark is a line that shifts from a predetermined one side toward an opposite side of the display unit.
(11)
The control apparatus according to any one of (1) to (10) described above, in which
the mark is an indicator that indicates a number of images allowed to be captured.
(12)
The control apparatus according to any one of (1) to (11) described above, in which
the mark is displayed for a time substantially equivalent to an exposure time.
(13)
The control apparatus according to any one of (1) to (12) described above, in which
the mark is displayed for a time longer than an exposure time when the exposure time is shorter than a predetermined time.
(14)
The control apparatus according to any one of (1) to (13) described above, in which
the mark is displayed at a position following a frame of autofocus in a mode continuing focusing during a half-press of a shutter button, and is displayed at a predetermined position within the display unit in a different mode.
(15)
The control apparatus according to any one of (1) to (14) described above, in which, in a continuous imaging mode that continuously captures a plurality of images, the mark is displayed at a start and an end of continuous imaging.
(16)
The control apparatus according to any one of (1) to (15) described above, in which:
the processing unit processes first data transmitted at first data density, and second data transmitted at second data density different from the first data density, the first data and the second data being based on pixel signals output from the plurality of pixels; and
the display unit causes the display unit to display an image based on the first data as the through image.
(17)
The control apparatus according to (16) described above, in which
the processing unit records, in a recording medium, the second data temporarily stored in a storage unit when an instruction of recoding the data is issued.
(18)
A control method of a control apparatus that includes:
a processing unit configured to process data based on pixel signals output from a plurality of pixels; and
a display control unit configured to control a display unit to display an image based on the data processed by the processing unit as a through image, the control method including:
a step configured to control the processing unit to display a mark indicating a recording process in response to an instruction of recording the data together with the through image displayed on the display unit.

(19)
A program for a computer that controls a control apparatus that includes:
a processing unit configured to process data based on pixel signals output from a plurality of pixels; and
a display control unit configured to control a display unit to display an image based on the data processed by the processing unit as a through image, the program causing the computer to execute a process that includes:
a step configured to control the processing unit to display a mark indicating a recording process in response to an instruction of recording the data together with the through image displayed on the display unit.

REFERENCE SIGNS LIST

100 . . . image sensor, 111 . . . pixel array unit, 190 . . . frame memory, 200 . . . image processing LSI, 210 . . . image processing section, 312 . . . CMOS sensor, 316 . . . image processing unit, 317 . . . display unit, 401 to 409 . . . mark, 501 . . . AF frame

The invention claimed is:
1. A control apparatus comprising:
a processing unit configured to
perform a still image capture process by processing data based on pixel signals output from a plurality of pixels,
receive a first instruction to perform the still image capture process, and
output a second instruction to display a non-text mark during the still image capture process in response to receiving the first instruction, the non-text mark indicating a performance of the still image capture process and not associated with any displayed text; and
a display control unit configured to
control a display unit to display a through image based on the data processed by the processing unit, and
control the display unit to display the non-text mark in response to receiving the second instruction,
wherein the non-text mark is displayed for a time equivalent to an exposure time when the exposure time is greater than or equal to a predetermined time, and
wherein the non-text mark is displayed for a time longer than the exposure time when the exposure time is shorter than the predetermined time.
2. The control apparatus according to claim 1, wherein the non-text mark is displayed at each of four corners of the display unit.
3. The control apparatus according to claim 1, wherein the non-text mark is displayed near a frame of autofocus.
4. The control apparatus according to claim 1, wherein the non-text mark is linearly displayed in each of upper and lower parts of the display unit.
5. The control apparatus according to claim 1, wherein the non-text mark is displayed in a shape along a frame of the display unit.
6. The control apparatus according to claim 1, wherein the non-text mark is displayed in a predetermined shape wherein a center of the predetermined shape is located at a center of the display unit.
7. The control apparatus according to claim 1, wherein the non-text mark is one of a plurality of non-text marks, the plurality of non-text marks is displayed in figures each having a predetermined shape wherein a center of the figures is located at a center of the display unit.

8. The control apparatus according to claim 1, wherein the non-text mark is a still image.

9. The control apparatus according to claim 1, wherein the non-text mark is a moving image.

10. The control apparatus according to claim 1, wherein the non-text mark is a line that shifts from a predetermined one side toward an opposite side of the display unit.

11. The control apparatus according to claim 1, wherein the non-text mark is an indicator that indicates a number of images allowed to be captured.

12. The control apparatus according to claim 1, wherein the non-text mark is displayed at a position following a frame of autofocus in a mode continuing focusing during a half-press of a shutter button, and is displayed at a predetermined position within the display unit in a different mode.

13. The control apparatus according to claim 1, wherein, in a continuous imaging mode that continuously captures a plurality of images, the non-text mark is displayed at a start and an end of continuous imaging.

14. The control apparatus according to claim 1, wherein the predetermined time is forty milliseconds, and the processing unit is further configured to determine whether the exposure time is less than the forty milliseconds, insert a first display command into the second instruction in response to determining that the exposure time is less than the forty milliseconds or less, the first display command controlling the display to display the non-text mark for a first period of time that is greater than the exposure time, and insert a second display command into the second instruction in response to determining that the exposure time is greater than or equal to the forty milliseconds, the second display command controlling the display to display the non-text mark for a second period of time that is equivalent to the exposure time.

15. The control apparatus according to claim 1, wherein the data is data of a single non-panoramic still image, wherein the non-text mark is superimposed on a portion of the through image, and wherein the portion of the through image is less than an entirety of the through image.

16. The control apparatus according to claim 1, wherein, to process the data based on the pixel signals output from the plurality of pixels, the processing unit is further configured to process first data transmitted at a first data density and second data transmitted at a second data density different from the first data density, the first data and the second data being based on the pixel signals output from the plurality of pixels, and wherein, to control the display unit to display the image based on the data processed by the processing unit as the through image, the display control unit is further configured to control the display unit to display the image based on the first data as the through image.

17. The control apparatus according to claim 16, wherein the processing unit records, in a recording medium, the second data temporarily stored in a storage unit when the first instruction is received.

18. A control method of a control apparatus, the method comprising:

processing, with a processing unit, data based on pixel signals output from a plurality of pixels;

controlling, with a display control unit, a display unit to display an image based on the data processed by the processing unit as a through image;

receiving, with the processing unit, a first instruction to perform a still image capture process;

performing, with the processing unit, the still image capture process by processing the data based on the pixel signals output from the plurality of pixels in response to receiving the first instruction;

outputting, with the processing unit, a second instruction to display a non-text mark during the still image capture process to the display control unit in response to receiving the first instruction, the non-text mark indicating a performance of the still image capture process and not associated with any displayed text; and controlling, with the display control unit, the display unit to display the non-text mark in response to receiving the second instruction, wherein the non-text mark is displayed for a time equivalent to an exposure time when the exposure time is greater than or equal to a predetermined time, and wherein the non-text mark is displayed for a time longer than the exposure time when the exposure time is shorter than the predetermined time.

19. The control method according to claim 18, wherein processing the data based on the pixel signals output from the plurality of pixels further includes processing first data transmitted at a first data density and second data transmitted at a second data density different from the first data density, the first data and the second data being based on the pixel signals output from the plurality of pixels, and wherein controlling the display unit to display the image based on the data processed as the through image further includes controlling the display unit to display the image based on the first data as the through image.

20. A non-transitory computer-readable medium including a program that, when executed by an electronic processor, causes the electronic processor to perform a set of operations comprising:

processing data based on pixel signals output from a plurality of pixels;

controlling a display unit to display an image based on the data processed as a through image;

receiving an instruction to perform a still image capture process;

performing the still image capture process by processing the data based on the pixel signals output from the plurality of pixels in response to receiving the instruction; and controlling the display unit to display a non-text mark during the still image capture process indicating a performance of the still image capture process and not associated with any displayed text in response to receiving the instruction, wherein the non-text mark is displayed for a time equivalent to an exposure time when the exposure time is greater than or equal to a predetermined time, and wherein the non-text mark is displayed for a time longer than the exposure time when the exposure time is shorter than the predetermined time.

* * * * *